US011353639B2

(12) United States Patent
Ang et al.

(10) Patent No.: US 11,353,639 B2
(45) Date of Patent: Jun. 7, 2022

(54) ANTI-GLARE, PRIVACY SCREEN FOR WINDOWS OR ELECTRONIC DEVICE DISPLAYS

(71) Applicant: LUMINIT LLC, Torrance, CA (US)

(72) Inventors: Anthony Ang, Torrance, CA (US);
Casey Scott Irvin, Torrance, CA (US);
Riberet Almeida, Torrance, CA (US)

(73) Assignee: Luminit LLC, Torrance, CA (US)

( * ) Notice: Subject to any disclaimer, the term of this patent is extended or adjusted under 35 U.S.C. 154(b) by 0 days.

(21) Appl. No.: 17/461,158

(22) Filed: Aug. 30, 2021

(65) Prior Publication Data

US 2021/0389506 A1     Dec. 16, 2021

Related U.S. Application Data

(63) Continuation of application No. 16/899,062, filed on Jun. 11, 2020.

(51) Int. Cl.
  *G02B 5/04*     (2006.01)
  *G06F 1/16*     (2006.01)
  *G02B 1/118*    (2015.01)

(52) U.S. Cl.
  CPC .............. *G02B 5/045* (2013.01); *G02B 1/118* (2013.01); *G06F 1/1609* (2013.01); *G02B 2207/123* (2013.01)

(58) Field of Classification Search
  CPC ...... G06F 1/1609; G06F 21/84; G06F 1/1603; G09G 2358/00; G02B 2207/123; G02B 5/045
  See application file for complete search history.

(56) References Cited

U.S. PATENT DOCUMENTS 6,443,579 B1 * 9/2002 Myers ................. G02B 5/045
                                                359/601
7,450,799 B2 * 11/2008 Selbrede ............ G02B 5/124
                                                359/222.1
(Continued)

FOREIGN PATENT DOCUMENTS

CN    105711211 A    6/2016
JP    2006054270 A   2/2006
(Continued)

OTHER PUBLICATIONS

JP Application No. 2021-095726, Office Action dated Nov. 30, 2021, 14 pages.
(Continued)

*Primary Examiner* — Stephone B Allen
*Assistant Examiner* — Adam W Booher
(74) *Attorney, Agent, or Firm* — Lathrop GPM LLP; Laura A. Labeots

(57) ABSTRACT

An array of microstructures or frustums on a substrate for reducing glare for electronic device displays or windows. The microstructures are designed to nearly perfectly align with the pixels on the display to avoid adverse viewing effects, such as Moiré effects. Substantially all light from the environment illuminating the front side of the film containing the microstructures from all angles is not reflected to the primary viewer (often viewing at an angle normal to the film). Light illuminating the microstructure from the environment will reflect off the microstructures at angles greater than a defined threshold outside the primary viewers field of view. Thus, glare to the primary viewer is minimized while glare to other views who view from other angles than the primary viewer is increased. This increased glare for other viewers adds privacy for the viewing by the primary viewer.

27 Claims, 31 Drawing Sheets

(56) References Cited

U.S. PATENT DOCUMENTS

| | | |
|---|---|---|
| 8,012,567 B2 | 9/2011 | Gaides |
| 8,133,572 B2 | 3/2012 | Gaides |
| 9,121,999 B2 | 9/2015 | Yan |
| 9,664,821 B2 | 5/2017 | Endoh |
| 10,371,983 B2 | 8/2019 | Lee |
| 10,732,449 B2 | 8/2020 | Lee |
| 2002/0163728 A1 | 11/2002 | Myers |
| 2004/0119912 A1 | 6/2004 | Takeuchi et al. |
| 2005/0041311 A1* | 2/2005 | Mi .................... G02B 6/0053 359/831 |
| 2007/0160811 A1 | 7/2007 | Gaides |
| 2009/0135491 A1 | 5/2009 | Endoh |
| 2012/0060431 A1 | 3/2012 | Belicofski |
| 2013/0004728 A1 | 1/2013 | Boyd |
| 2014/0055859 A1* | 2/2014 | Vasylyev ............. B29D 11/00 359/593 |
| 2014/0204464 A1 | 7/2014 | Halverson |
| 2015/0036080 A1 | 2/2015 | Yan |
| 2016/0244642 A1 | 8/2016 | Edmonds |
| 2018/0031907 A1 | 2/2018 | Lee |
| 2019/0302518 A1 | 10/2019 | Lee |
| 2019/0346615 A1* | 11/2019 | Johnson ................ G02B 5/136 |

FOREIGN PATENT DOCUMENTS

| | | | |
|---|---|---|---|
| JP | 2009-258242 A | 11/2009 | |
| JP | 2010-145976 A | 7/2010 | |
| JP | 2014142637 A * | 8/2014 | ......... G06F 21/6245 |
| WO | WO-2014103343 A1 * | 7/2014 | ......... G06F 21/6245 |
| WO | 2019045095 A1 | 3/2019 | |
| WO | 2020178883 A1 | 9/2020 | |

OTHER PUBLICATIONS

EP Application No. 21178663.7, Extended European Search Report, dated Nov. 2, 2021, 8 pages.

JP Application No. 2021-095726 Office Action dated Mar. 22, 2022, 7 pages.

U.S. Appl. No. 16/899,062, Non-Final Office Action dated Apr. 27, 2022, 19 pages.

* cited by examiner

ANTI-GLARE, PRIVACY SCREEN FOR WINDOWS OR ELECTRONIC DEVICE DISPLAYS

CROSS-REFERENCE TO RELATED APPLICATIONS

This application claims priority to pending U.S. patent application Ser. No. 16/899,062, filed Jun. 11, 2020, the entire disclosure of which is hereby incorporated by reference.

TECHNICAL FIELD

This application is directed to an anti-glare, privacy screen for windows or electronic device displays. In particular, this screen is designed so as to selectively reduce environmental glare relative to the primary viewer, while increasing glare for others outside of the primary viewer's field of view. This privacy screen thus improves the quality of the view for the primary viewer and hinders unwanted viewing by nearby bystanders.

BACKGROUND

Older television screens used grey tinting on the screen to help combat ambient light that interfered with enjoyment of the picture. However, glare could still come from a light source reflecting from the smooth surface of the television glass. One way to combat this glare was to arrange the television and lighting to reduce the glare on the television screen. Another way for more expensive television screens was to include a diffuser surface to combat the direct reflections of light. However, these implements failed to remedy the instance of lights behind the user causing some haze on the screen.

For hand-held electronic devices, in addition to glare, a lack of privacy is a major concern, especially in crowded areas. Although dark-colored, tempered glass and plastic films are commercially available and can be used, these measures merely reduce glare at all angles, so little to no privacy protection is provided. Moreover, these types of screen protectors adversely affect the screen brightness and clarity. Also, in hand-held devices, increasing the screen brightness of the device to compensate for a dimmer screen can drain the battery quickly. Other measures, such as micro-louver screen protectors, can suffer from decreased light transmittance, reduced screen clarity, diminished color contrast, image distortion, and glare from light behind the user.

Thus, there exists a need for an effective solution to the problem of lack of privacy for the screens of electronic devices while at the same time decreasing glare for the primary viewer and increasing glare for others, which the present disclosure addresses.

BRIEF SUMMARY

The present disclosure is directed to a privacy screen for an electronic display or a window comprising an array of frustums positioned on a substrate wherein the index of refraction of the substrate is comparable to the index of refraction of the frustum, wherein the index of refraction of the spaces between the frustums is lower than the index of refraction of the frustums, and wherein incoming light is controlled in at least one direction.

In one embodiment, the substrate and the frustums comprise the same material.

In another embodiment, the width of the top of the frustums is about 8-16 microns wide and the width of the base is about 10-20 microns wide.

In another embodiment, the base of the frustum is larger than the top of the frustum.

In another embodiment, the frustums are perfectly aligned with pixels of the device display.

In another embodiment, the substrate is flexible, rigid, or a combination thereof.

In another embodiment, the frustums comprise conical frustums, square frustums, pentagonal frustums, hexagonal frustums, octagonal frustums, n-gon frustums, irregular polygon frustums, star frustums, donut frustums, frustums hollowed out by removing a central region of the frustum of a certain shape, or any combination thereof.

In another embodiment, one or more of parameters of the frustums are varied to optimize optical performance, wherein the parameters include height, size, spacing from a center of one frustum to a center of an adjacent frustum, arrangement, rotation of the frustum about an axis normal to a surface of the substrate, angles between a side of the frustum and the base of the frustum, centeredness of the top surface of the frustums with respect to the base of the frustums, index of refraction of the frustums, and combinations thereof.

In another embodiment, the geometric shape of each frustum results from a subtraction of a smaller frustum from a larger frustum, wherein the larger frustum and the smaller frustum share the same top surface, wherein the top surface is parallel to a plane of a surface of the substrate.

In another embodiment, the top surfaces of the frustums are parallel to each other and either parallel to a plane of a surface of the substrate or not parallel to the surface of the substrate.

In another embodiment, the frustums with tops that are parallel to the surface of the substrate comprise steep side walls having a steepness of about 80 degrees from a plane of the surface of the substrate, wherein light illuminating the substrate does not produce reflective glare into a primary viewing angle range of about +/−30 degrees with respect to normal to the surface of the substrate, but does produce glare outside of the primary viewing angle.

In another embodiment, an internal angle of a side of the frustum to the base of the frustum is greater than or equal to 45 degrees.

In another embodiment, gaps or no gaps exist between the bases of adjacent frustums in the array.

In another embodiment, the gap between the bases of adjacent frustums comprises a size of about 0-5 times the base of the frustums.

In another embodiment, each frustum is initially positioned randomly on the surface of the substrate without overlapping an adjacent frustum, wherein additional different frustums of various sizes are iteratively placed in-between existing frustums, wherein initial spaces between the frustums are filled up with the additional different frustums of various sizes, and wherein all frustums are fully intact.

In another embodiment, each frustum is initially positioned randomly on the substrate without overlapping an adjacent frustum, wherein additional different frustums of various sizes are iteratively placed in-between existing frustums, wherein initial spaces between the frustums are filled up with the additional different frustums of various sizes except for a predetermined border, wherein no frustums overlap each other, and wherein all frustums are fully intact. This predetermined border provides a gap between frustums.

In another embodiment, the microstructures or nanostructures on the surface of the substrate are an inverse surface relief of frustums or a mixture of frustums and inverse surface relief of frustums and wherein the inverse surface relief structures have a lower index of refraction than the surrounding material. In another embodiment, the microstructures or nanostructures on the substrate are a combination of frustums and inverse frustums.

In another embodiment, a second substrate is bonded to the top surfaces of the frustums, wherein the top surfaces of the frustums is in contact with a surface of the second substrate, wherein the second substrate comprises a same index of refraction as the frustums and a first substrate, wherein there is no significant back-scattering of light passing through an interface between the top surfaces of the frustums and the surface of the second substrate, and wherein there is no significant degradation in transmission of light passing through the first substrate, the frustums, and second substrate due to the interfaces.

In another embodiment, the privacy screen includes an anti-reflective coating, a transparent dielectric coating, or a combination thereof.

In yet another embodiment, the spacing of the frustums match the spacing of pixels of a display of an electronic device to which the frustums are applied.

In still another embodiment, the frustums comprise an array that is aligned with an array of pixels of a display of an electronic device to which the array of frustums is applied.

In another embodiment, there is an integer number of one or more frustums within each pixel pitch.

In yet another embodiment, the frustums comprise rectangular frustums wherein there is an integer number of frustums per pixel in one axis and an integer number of frustums per pixel in the other axis and wherein the number of frustums in the axes are the same number or a different number.

Also disclosed herein is a method of fabricating a flexible or rigid substrate including an array of microstructures or nanostructures on one side of the substrate comprising coating a substrate with a uniform thickness of photoresist polymer; which includes applying a rastering laser beam to form the microstructure or nanostructure to make molds, replicas, final parts, or mixtures thereof.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF EXEMPLARY EMBODIMENTS

Electronic screens of laptops, tablets, phones, e-readers, etc. under ambient light conditions must regulate glare from direct reflected images originating from smooth optical surfaces as well as haze coming from diffuse reflective surfaces in order to provide a clear, high contrast image. A vibrant image is vital for reading to obtain informational content, to protect from distraction, and to provide a comfortable view of the image. A clear, distinct image reduces eye strain and other biological problems. In addition, screen privacy is important when the user is in a public or semi-public setting.

The present application relates to a privacy screen having a solid substrate that is transparent to some or all of the ultraviolet, visible and infrared light spectrum. The reflected light from the initial screen surface is scattered to break up the strong imaging specular reflection, and also to reduce the rays that scatter in the direction of the intended primary viewer. Most of the light must be allowed to transmit to the secondary layers, which house the e-ink, and are close to the surface normal. In this manner, the reflected light from the e-ink is relatively strong compared to the scattered light from the first surface when viewed by the primary user, which establishes a high signal to noise ratio. The aim is to reduce eye strain and other long-term biological degradation to the eyes. In addition, a secondary effect, which is also favorable, is to make the scattered light from the first surface stronger outside the primary viewing angle. The signal to noise is therefore inverted towards the unwanted audience. This provides increased privacy for the primary viewer when an electronic device is used in public places.

This privacy screen contains a clear substrate containing surface microstructures made of optically clear material, which serve as optical elements that allow light, within a select range of angles from the normal to the plane of a window or display screen, to pass through and reach the window or display screen. Other incident light undergoes total internal reflection (TIR) within the microstructures before being reflected back to the viewer. Thus, such a screen reduces environmental glare to the primary viewer who is viewing the screen within the range of angles around the primary viewing angle, while increases glare to other viewers outside the viewer's field of view, which provides privacy for the viewer and improves the screen view for the primary viewer.

Figure 1:
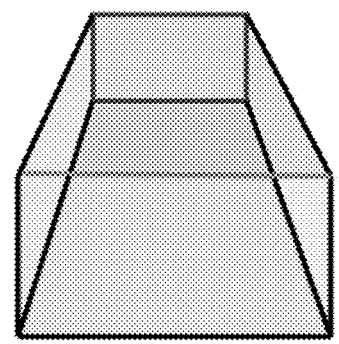
FIG. 1: Square Frustum.
Figure 2:
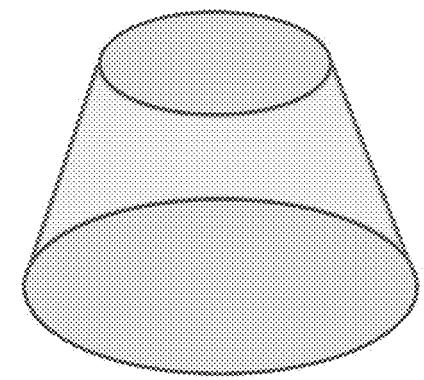
FIG. 2: Conical Frustum.
Figure 3:
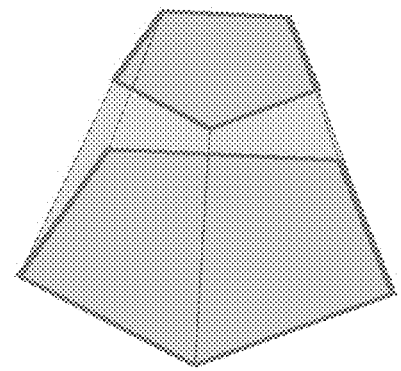
FIG. 3: Pentagonal Frustum.
Figure 5:
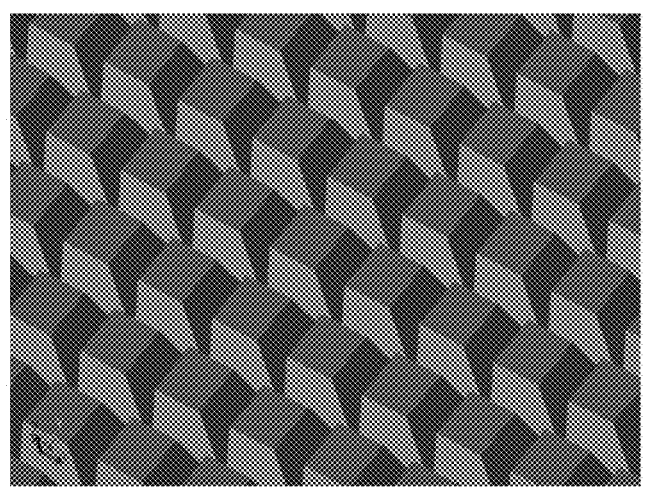
FIG. 5: Example of Array of Square Frustums.
Figure 6:
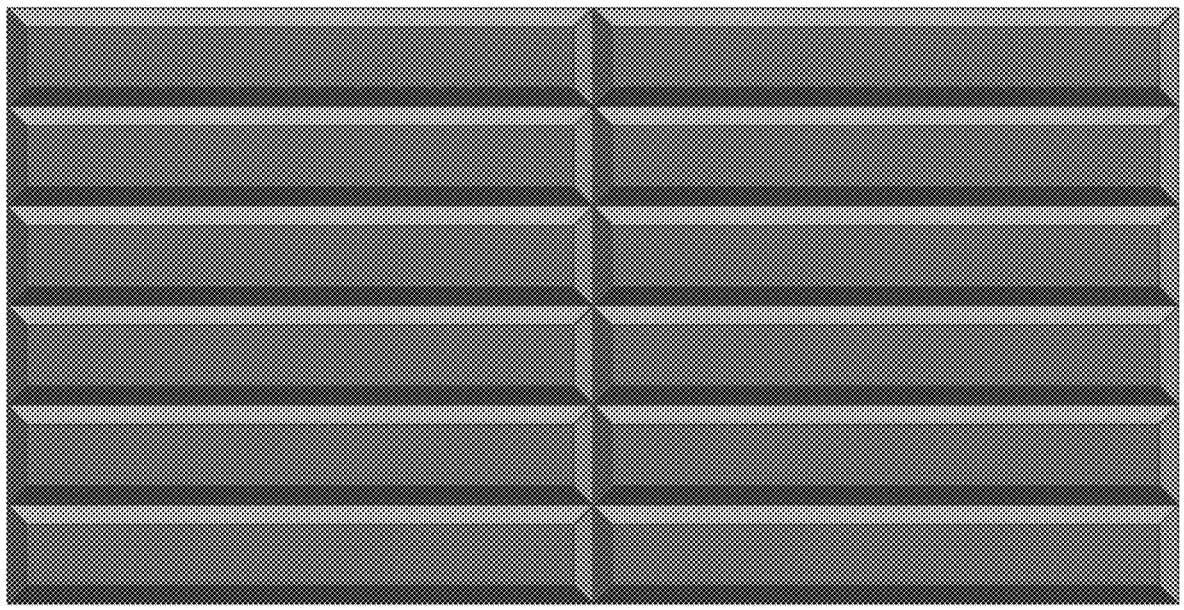
FIG. 6: Array of Rectangular Frustums.
Figure 7:
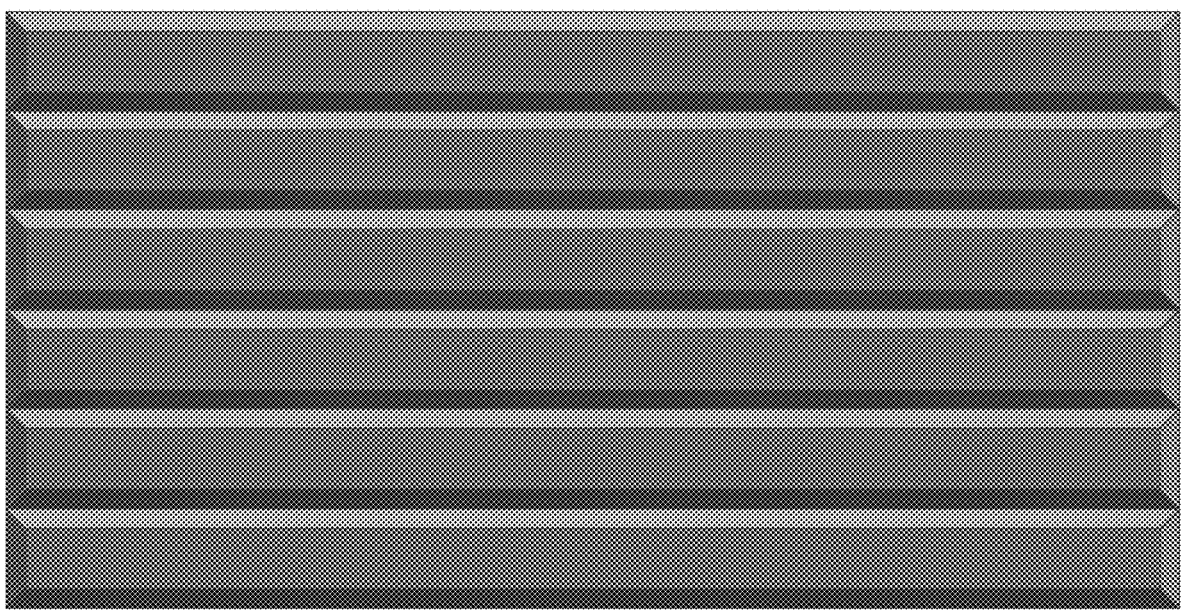
FIG. 7: Array of Rectangular Frustums with lengths significantly longer than widths.

More specifically, this application is directed to a privacy screen having a substrate comprising nanostructures or microstructures, known as frustums, on a surface of the substrate. The frustums can cover the entire width and/or length of the substrate or partially cover the substrate. A frustum is generally defined as any part of a geometric shape between two parallel planes. FIG. 1 is a drawing of a square frustum. FIG. 2 is a drawing of a conical frustum. FIG. 3 is a drawing of a pentagonal frustum. The frustums are arranged in an array, such as that shown in FIGS. 4 and 5, which are examples of a top view of an array of square frustums. In both of those examples, the base of the frustum is larger than the top surface of the frustum so that the sides of the frustum are slanted at an angle. FIG. 6 is a drawing of an array of rectangular frustums. FIG. 7 is a drawing of an array of rectangular frustums where the lengths are significantly longer than the widths. The length of the frustum can extend the entire length of the screen. The rectangular frustums can extend over the entire privacy screen or beyond the edges of the privacy screen. This embodiment can have the effect of reducing the glare on one axis while not reducing the glare in the perpendicular axis.

Figure 8:
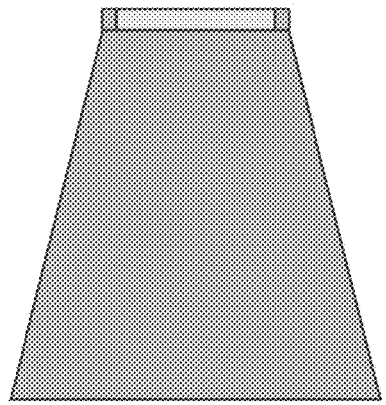
FIG. 8: Side view of Frustum with lip on surface extending around perimeter.
Figure 9:
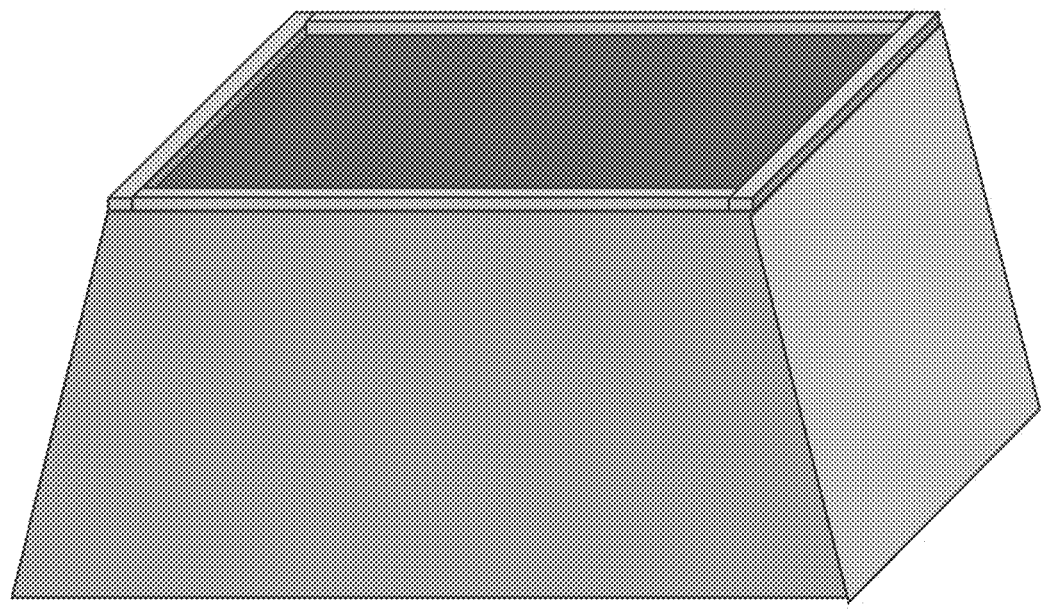
FIG. 9: Dimensional view of Frustum with lip on surface extending around perimeter.

In another embodiment, a portion of the top surface of the frustum is raised up above the rest of the surface of the frustum, as in a lip of the frustum. A side view of a frustum having a lip on the surface that extends around the top surface of the frustum, shown in FIG. 8. FIG. 9 shows a dimensional view of a frustum with a lip on the top surface, which extends around the perimeter of the top surface. In general, the lip has a width and a height between 0.1 to 5 microns.

In some embodiments, the frustum base ranges from about 1 to 500 microns in width and the frustum top surface ranges from about 0.5 to 499 microns in width. Generally, the height of a frustum is between about 1 to 500 microns. In another embodiment, the frustums have a height to base aspect ratio of about 1:1, so that the height is similar to the base of the frustum. For an individual frustum, the base of the frustum is wider than the top of the frustum.

Figure 60:
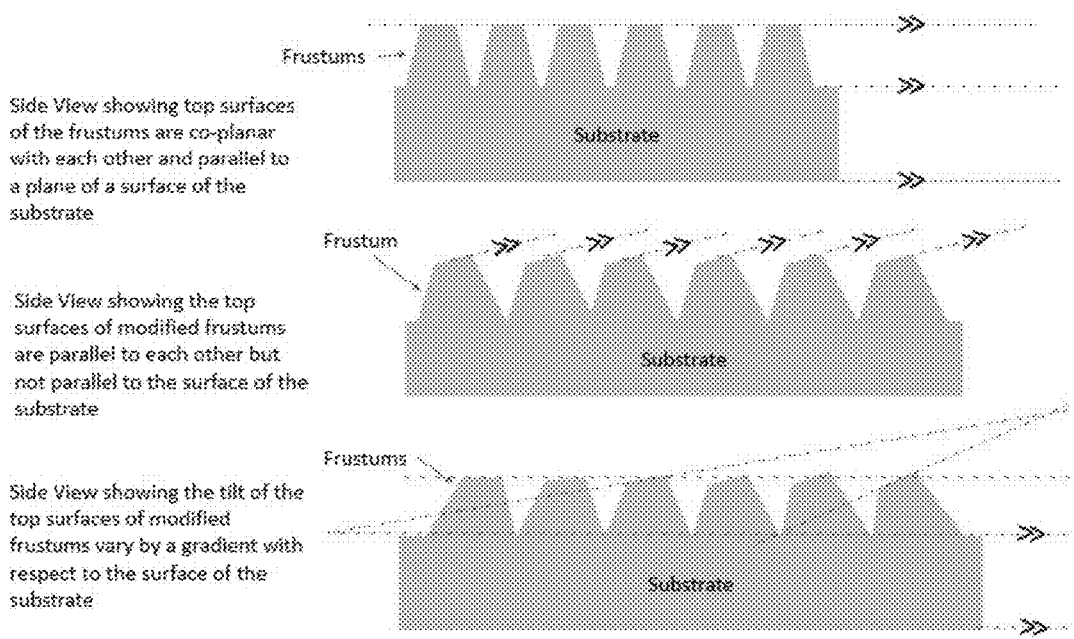
FIG. 60: Side views of three different types of frustums in which the tops of the frustums are either all parallel to the surface of the substrate or the tops of the frustums are all parallel to each other but not parallel to the surface of the substrate, or the tilt of the top surfaces of modified frustums vary by a gradient with respect to the surface of the substrate.
Figure 62:
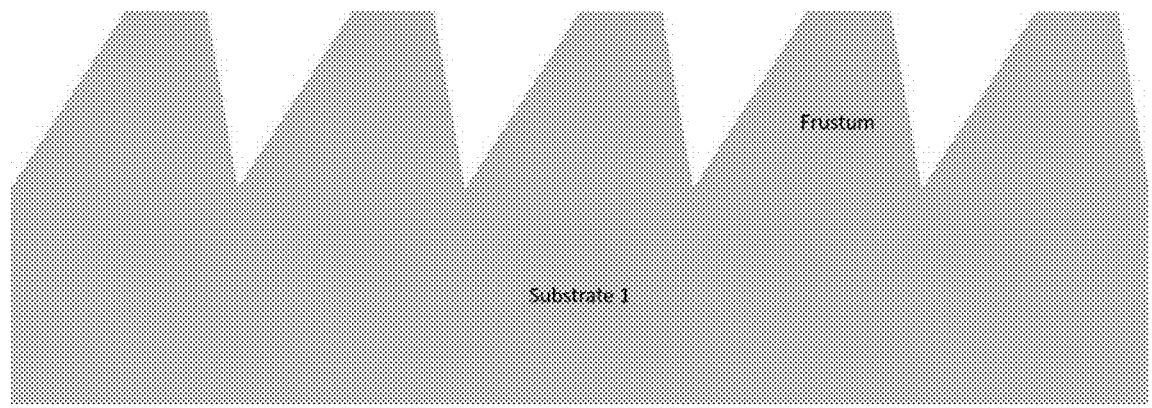
FIG. 62: Side view of non-right frustums in which the top of the frustum is not centered above the base of each frustum.

The top surfaces of the frustums can be centered or off-centered above the base of the frustum. FIG. 62 shows the side view of non-right frustums in which the tops are not centered above the bases of the frustums. The top surfaces can be off-centered according to a gradient offset across the array or can be off-centered according to a constant offset. Also, some of the frustums can be centered and some off-centered in the same or varying amounts so the slopes of the sides of the frustums are different. The tops of the frustums can be parallel to each other and not parallel to the surface of the substrate, as shown in FIG. 60. In addition, the tops of the frustums can be tilted, by a constant amount, a varying amount, a gradient, or a combination thereof. Both parameters, being off-centered and tilted, can change the primary viewing angle of the privacy screen because the reflection of glare is different with different combinations and compositions of frustums. In an embodiment, the geometric shape of each frustum results from a subtraction of a smaller frustum from a larger frustum, wherein the larger frustum and the smaller frustum share the same top surface, wherein the top surface is parallel to a plane of a surface of the substrate.

Figure 4:
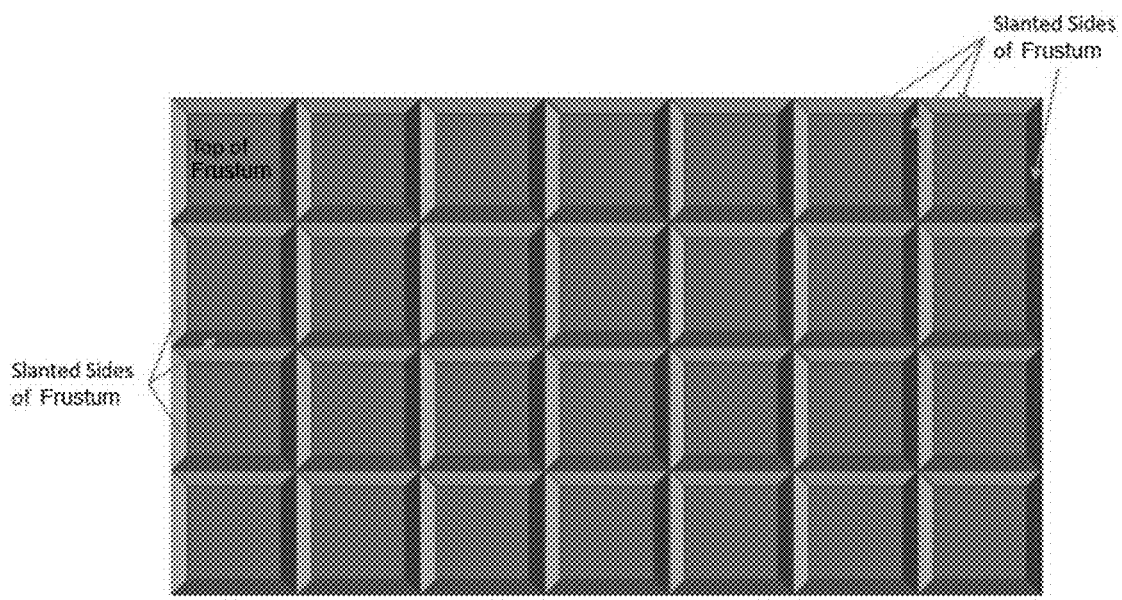
FIG. 4: Top View of Array of Square Frustums.
Figure 10:
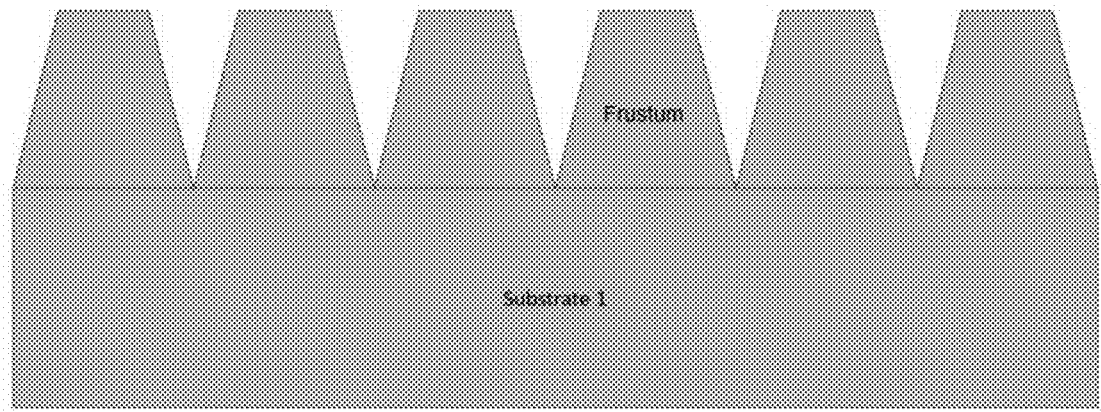
FIG. 10: Side View of Grid Array of Square Frustums with no gap between Frustums.
Figure 11:
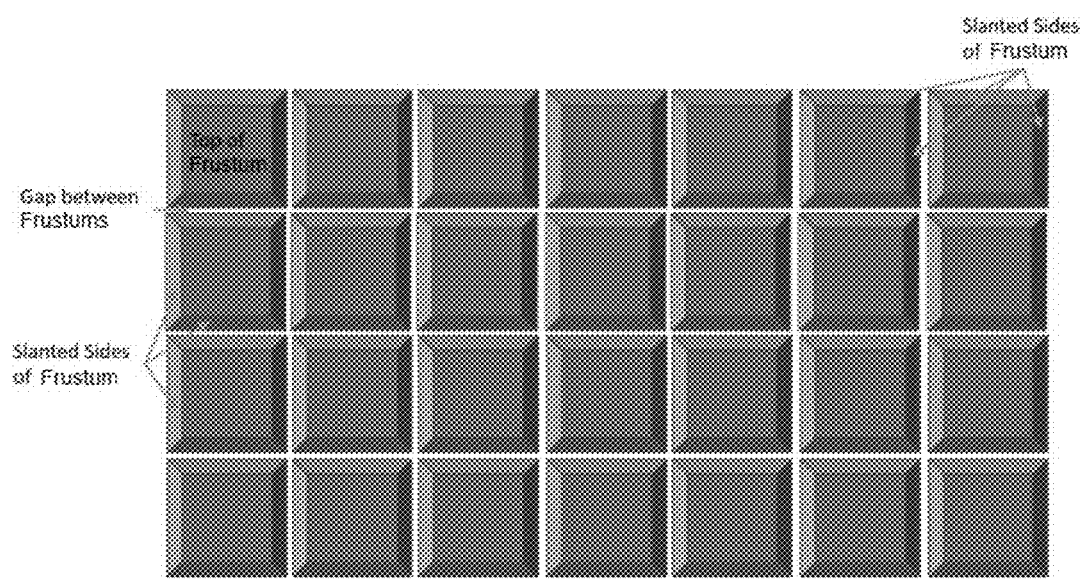
FIG. 11: Top View of Array of Square Frustum with gaps in between Frustums.
Figure 12:
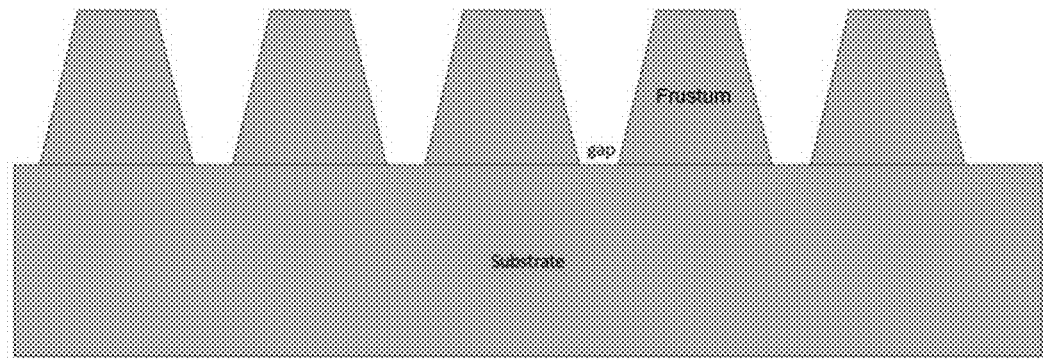
FIG. 12: Side View of Grid Array of Square Frustums with gap between Frustums.
Figure 13:
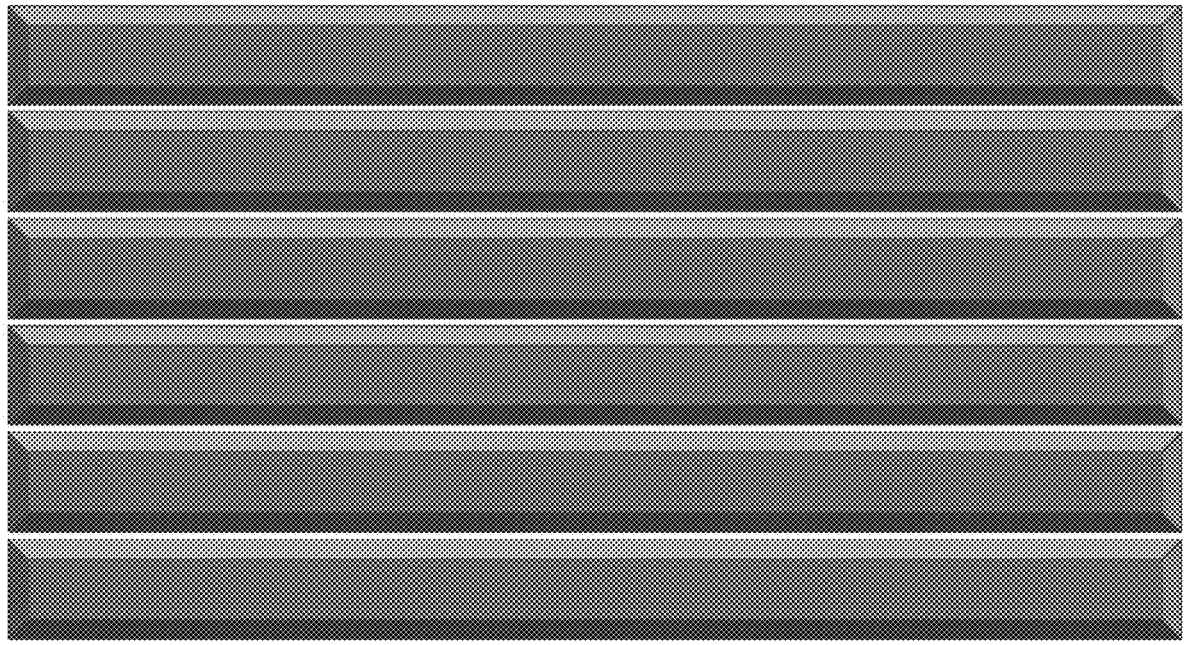
FIG. 13: Array of Rectangular Frustums with lengths significantly longer than widths and gaps.

FIG. 4 illustrates an array where there are no gaps between the bases of adjacent frustums. A side view of the square frustum array with no gaps is shown in FIG. 10. In FIG. 11, which is also an example of a top view of an array of square frustums, there are gaps between the bases of adjacent frustums. The gap between the bases of adjacent frustums comprises a size of about 0-5 times the width of the base of the frustums. A side view of the square frustum array with gaps is shown in FIG. 12. FIG. 13 shows a rectangular array of frustums with lengths that are significantly longer than the widths of each base and comprising a gap between the frustums.

Figure 14:
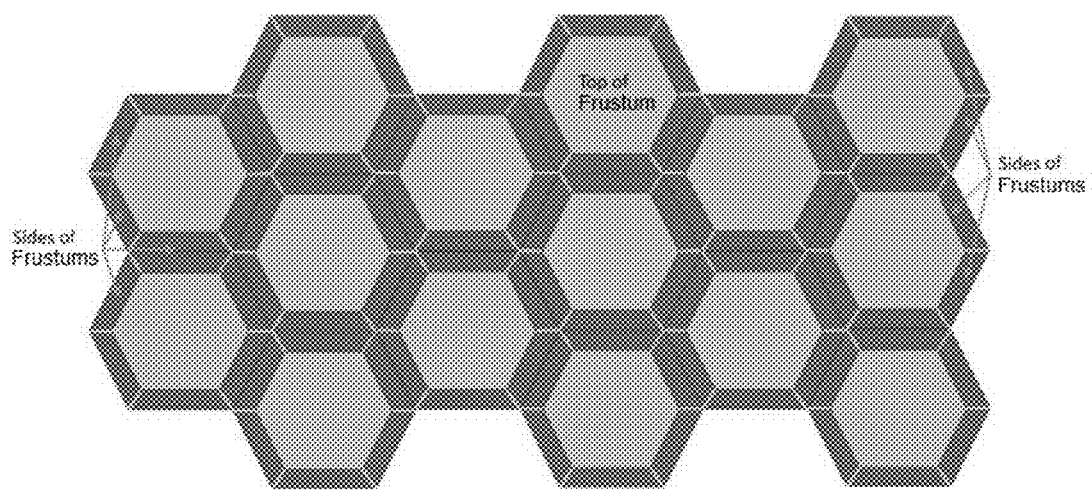
FIG. 14: Top View of Array of Hexagonal Frustums.
Figure 15:
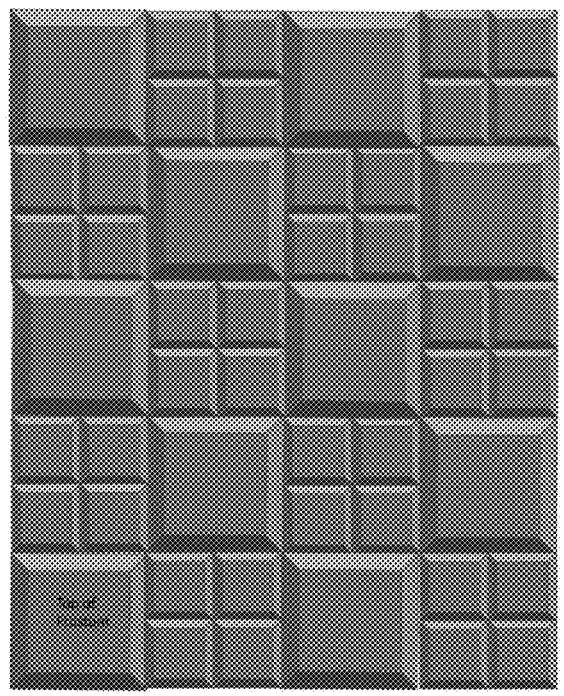
FIG. 15: Array of Square Frustum of two Different Sizes and a Certain Checkerboard Pattern.
Figure 16:
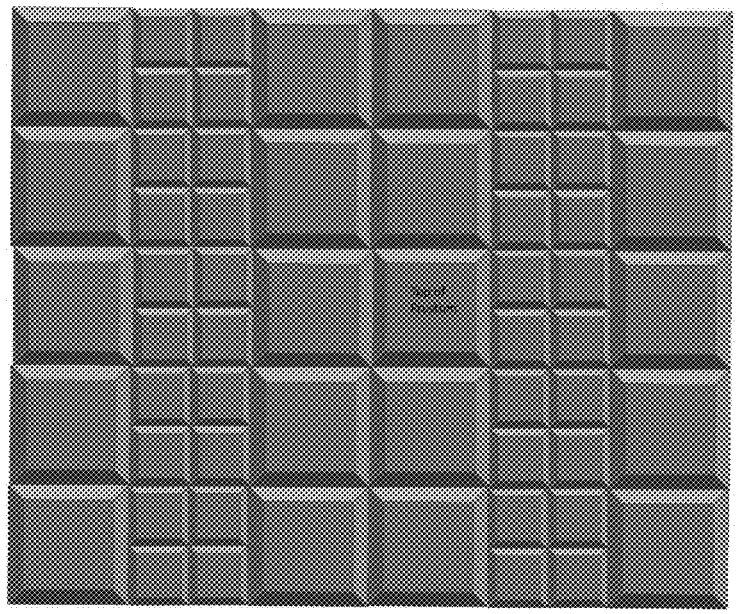
FIG. 16: Array of Square Frustum of two Different Sizes and a Certain Pattern.

In another embodiment, the frustums are conical frustums, square frustums, pentagonal frustums, hexagonal frustums, octagonal frustums, n-gon frustums, rectangular frustums, diamond frustums, rhombus frustums, quadrilateral frustums, star frustums, donut frustums, irregular polygon frustums, frustums hollowed out by removing a central region of the frustum of a certain shape, or any combination thereof. The frustums can be an inverse surface relief of frustums or a mixture of frustums and inverse surface relief of frustums wherein the inverse surface relief structures have a lower index of refraction than the surrounding material. FIG. 14 illustrates a top view of an array of hexagonal frustums. In some embodiments, the frustums in the array are all the same shape and size. However, the frustums can also be of different shapes and/or different sizes, as shown in FIGS. 15 and 16, which show a top view of different patterns of frustum arrays. Each frustum is initially positioned randomly on the surface of the substrate without overlapping an adjacent frustum, wherein additional different frustums of various sizes are iteratively placed in-between existing frustums, wherein initial spaces between the frustums are filled up with the additional different frustums of various sizes, and wherein all frustums are fully intact. In another embodiment, all frustums are fully intact except for a predetermined boarder around each frustum. The frustums can also be rotated with respect to each other.

Figure 17:
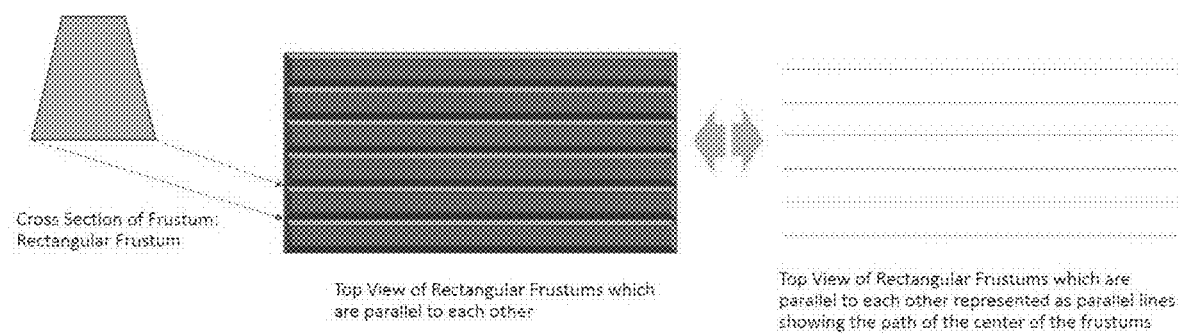
FIG. 17: Depiction of Rectangular Frustums.
Figure 18:
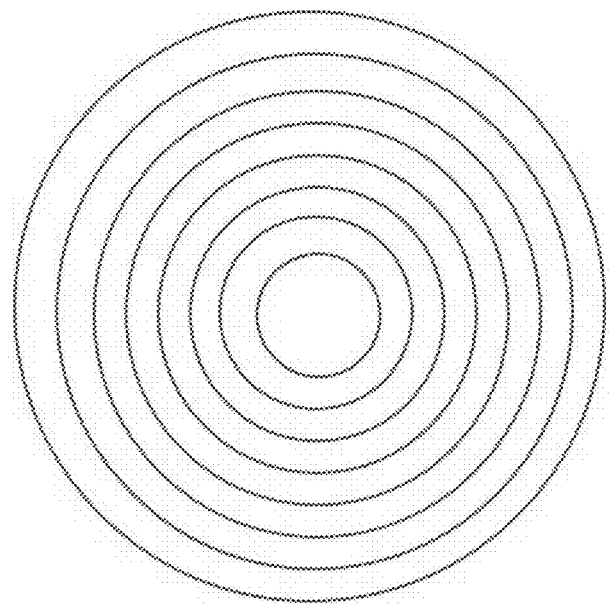
FIG. 18: Representing Rectangular Frustums following paths of concentric circles.
Figure 19:
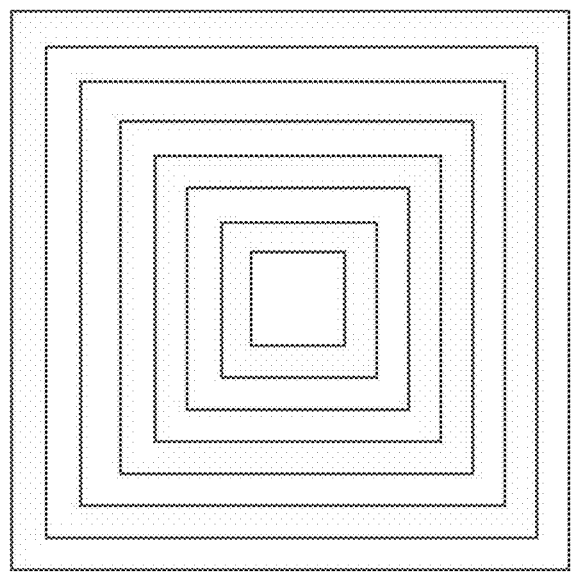
FIG. 19: Representing Rectangular Frustums following paths of concentric squares.
Figure 20:
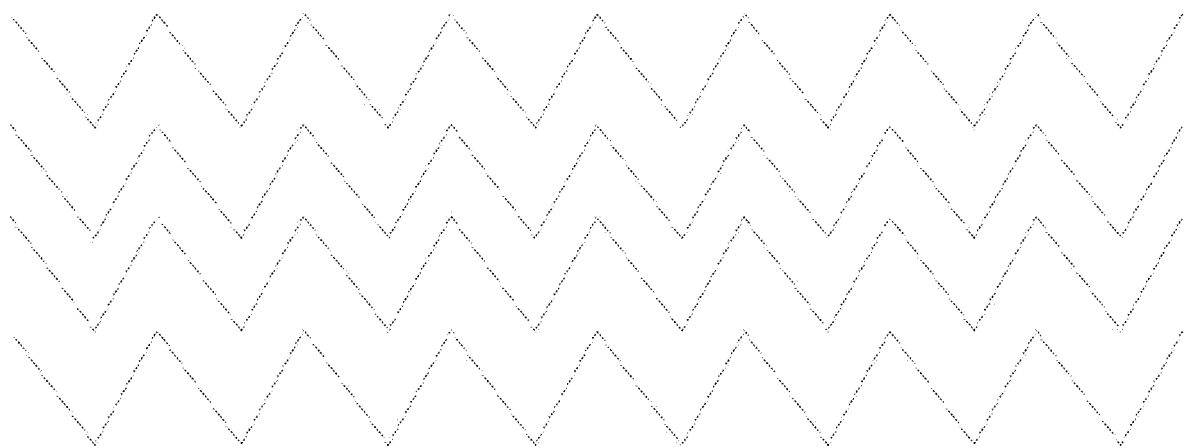
FIG. 20: Representing Rectangular Frustums following paths of triangle waves.
Figure 21:
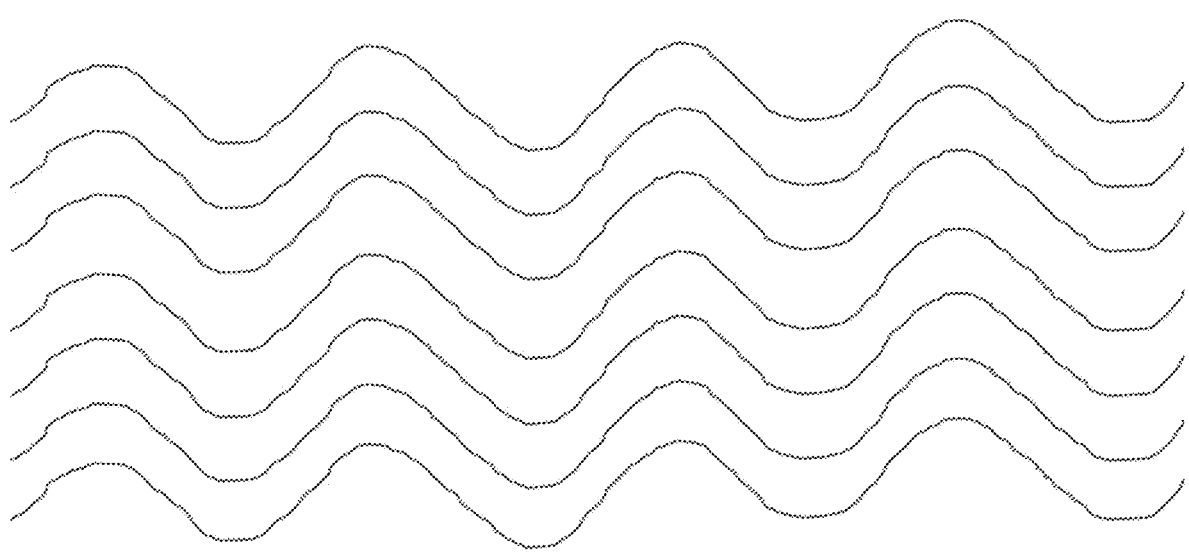
FIG. 21: Representing Rectangular Frustums following paths of curved waves.

In another embodiment, the frustums can have a cross section of a square or rectangular frustum but follow a path of a pattern in another direction. In this manner, the structures form modified frustums. For example, the rectangular frustums in FIG. 7 can be described as frustum with a cross section of a rectangular frustum and following the paths of parallel lines in the other dimension, as shown in FIG. 17. Likewise, FIGS. 18-21 show other patterns which represent paths that frustums can follow. These are top views of the patterns that the centers of the frustums follow. In these cases, the cross sections are rectangular frustums, but in other embodiments, the cross sections can be frustums with other cross sections. FIG. 17 shows an arrangement of parallel rectangular frustums as parallel lines indicating the arrangement of the paths of the center of each frustum on the substrate. FIG. 18 shows a representation of a top view of rectangular frustums following paths of concentric circles. FIG. 19 shows a representation of a top view of rectangular frustums following paths of concentric squares. FIG. 20 shows a representation of rectangular frustums following paths of triangle waves. FIG. 21 shows a representation of a top view of rectangular frustums following paths of curved waves. The rectangular frustums can extend along the entire length of the privacy screen, or width of the screen, or can extend beyond the edges of the screen.

The substrate has frustums on one surface of the substrate, where the base of the frustum is attached to the back surface of the substrate. The substrate and the frustum can be the same or different material. The substrate can be a polymer, glass, ceramic, metal, or a combination thereof. In one embodiment, the substrate is a thermoplastic polymer film, such as polycarbonate or polyethylene terephthalate. The substrate can be flexible, rigid, or a combination thereof.

The substrate is transparent to ultra-violet, visible, infrared light, or mixtures thereof. The transparency is adjustable so that the substrate and the frustums are transparent to a very narrow range of light or to a very broad range of light. In one embodiment, the index of refraction of the substrate and the frustums are the same and in another embodiment, the index of refraction of the substrate and the frustums are similar but not exactly the same.

Figure 22:
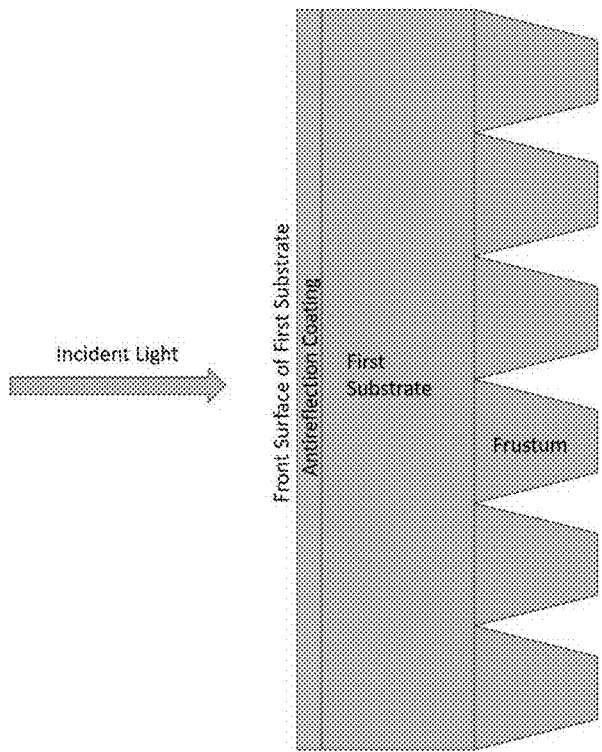
FIG. 22: Side View of Film consisting of an array of Square Frustum on the Back Surface of a Substrate.

An anti-reflection coating can be placed on the top surface of the substrate, as shown in FIG. 22, where the substrate is labelled as "First Substrate." When light from the environment is incident on the front surface of the substrate, the anti-reflection coating prevents light from reflecting off the front surface of the substrate. Thus, the ambient light transmits through the substrate and reaches the frustums. The anti-reflection coating can cover the entire surface or part of the surface. The anti-reflection coating can cover the top surface of the frustum but not the sides of the frustum. The anti-reflection coating can be one or more dielectric layers. The substrate can comprise both an anti-reflective coating and a transparent dielectric coating.

In one embodiment, the index of refraction of the substrate and the microstructures are substantially the same, which allowed most light to transmit from the substrate to the microstructures. The index of refraction of the space outside the substrate and between the frustums is significantly different from the index of refraction of the frustums, which have a higher index of refraction. The side walls of the frustums are steep enough so as to cause total internal reflection to occur for the light transmitted through the substrate at certain angles with respect to the plane of the substrate, as seen in the ray tracing of FIGS. 23-33.

Figure 23:
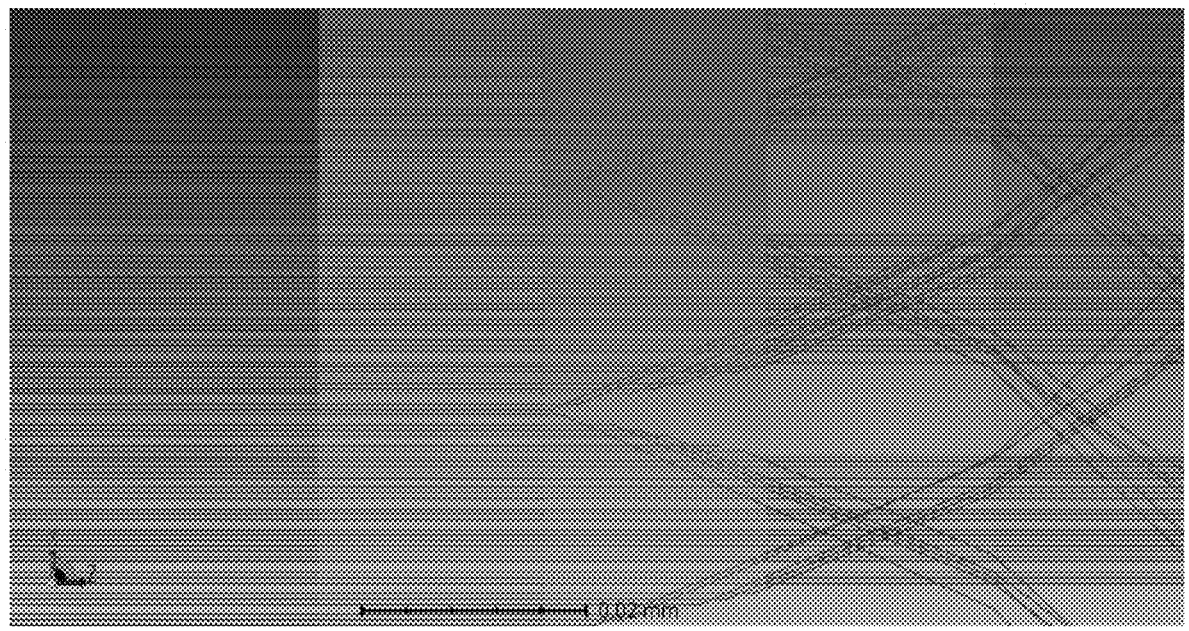
FIG. 23: ANGLE OF INCIDENCE zero degrees.
Figure 24:
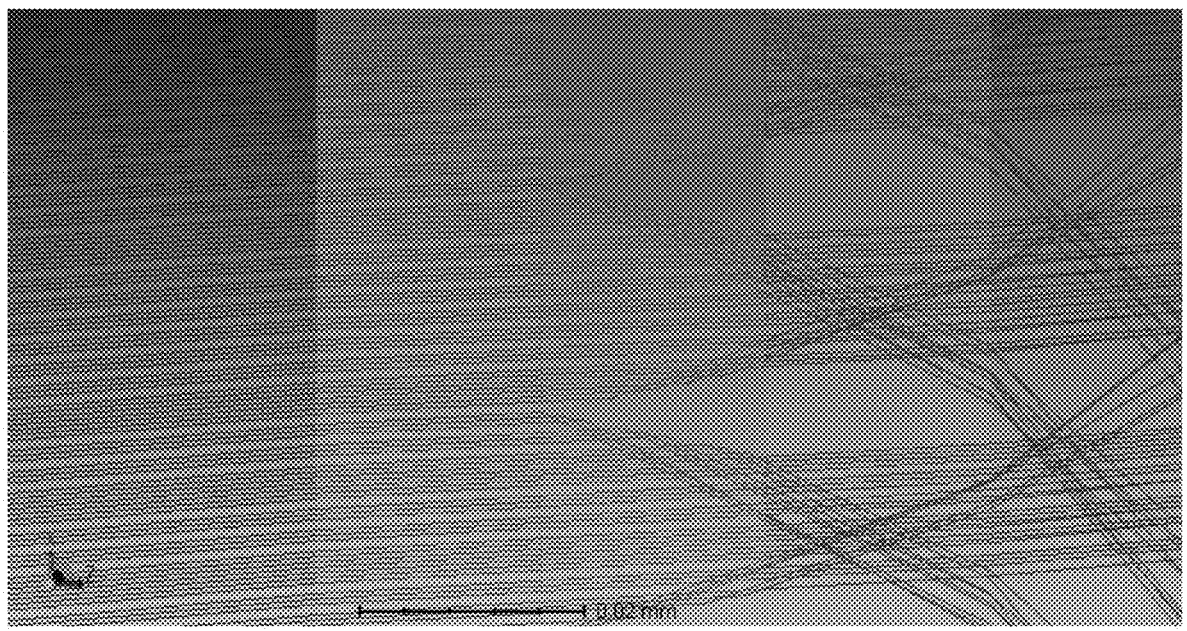
FIG. 24: ANGLE OF INCIDENCE 5 degrees.
Figure 25:
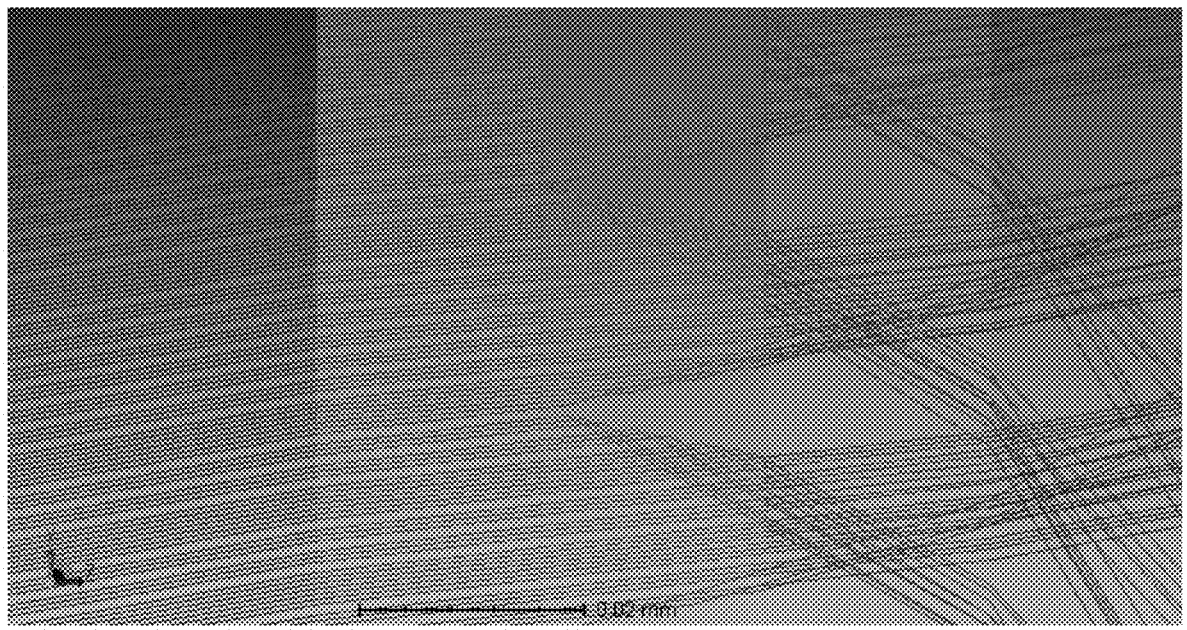
FIG. 25: ANGLE OF INCIDENCE 10 degrees.
Figure 26:
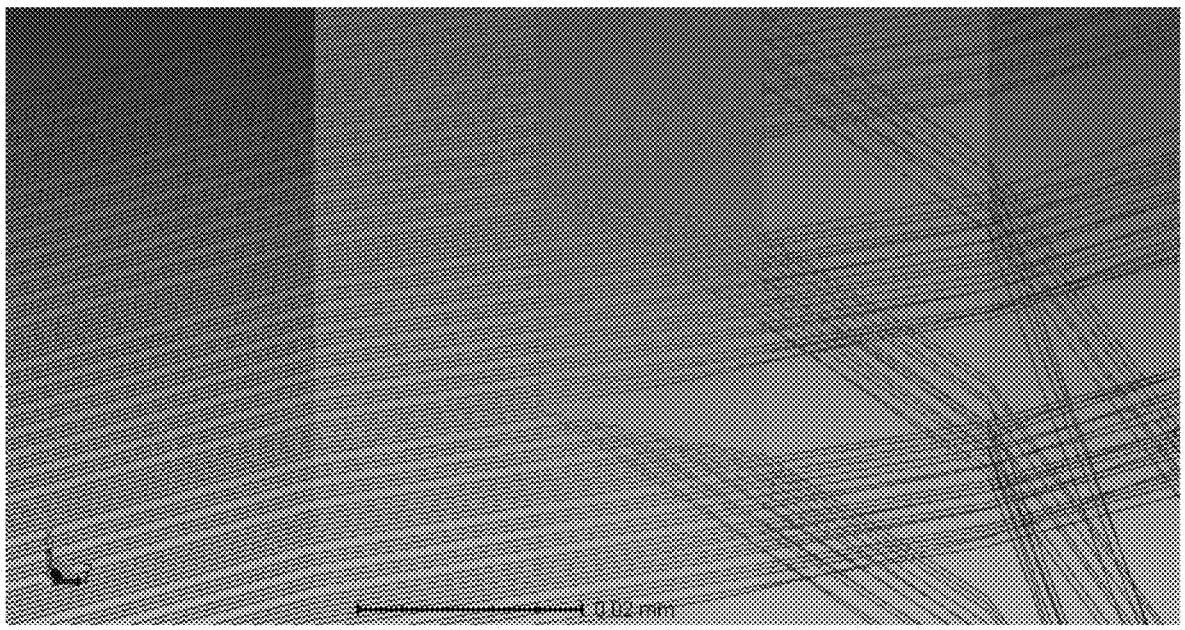
FIG. 26: ANGLE OF INCIDENCE 15 degrees.
Figure 27:
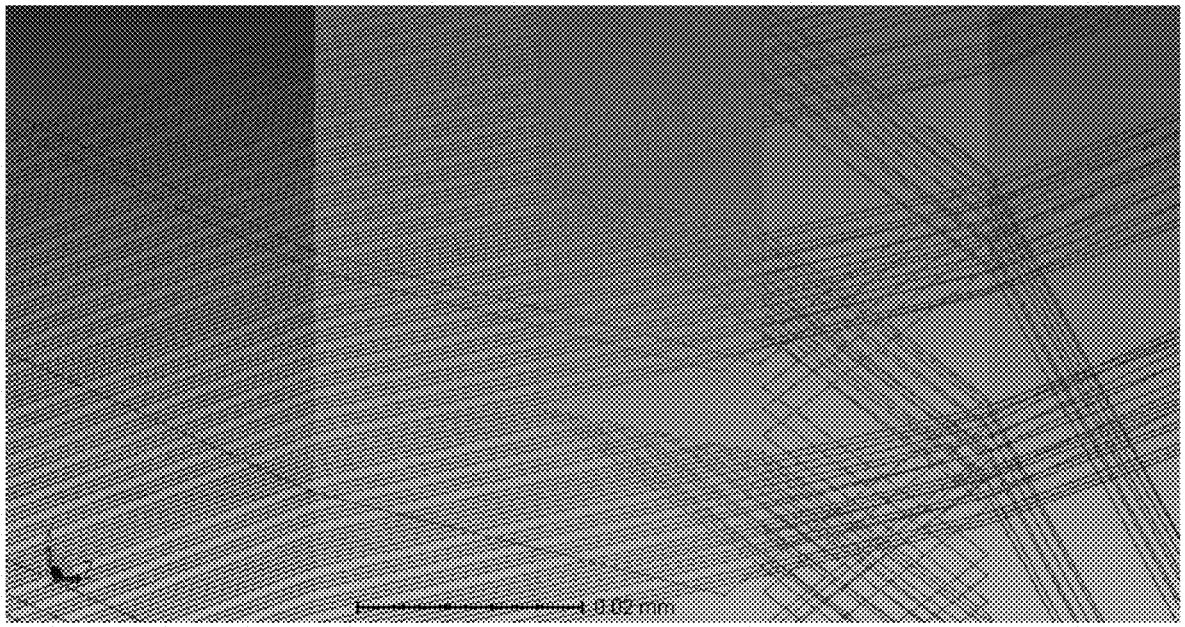
FIG. 27: ANGLE OF INCIDENCE 20 degrees.
Figure 28:
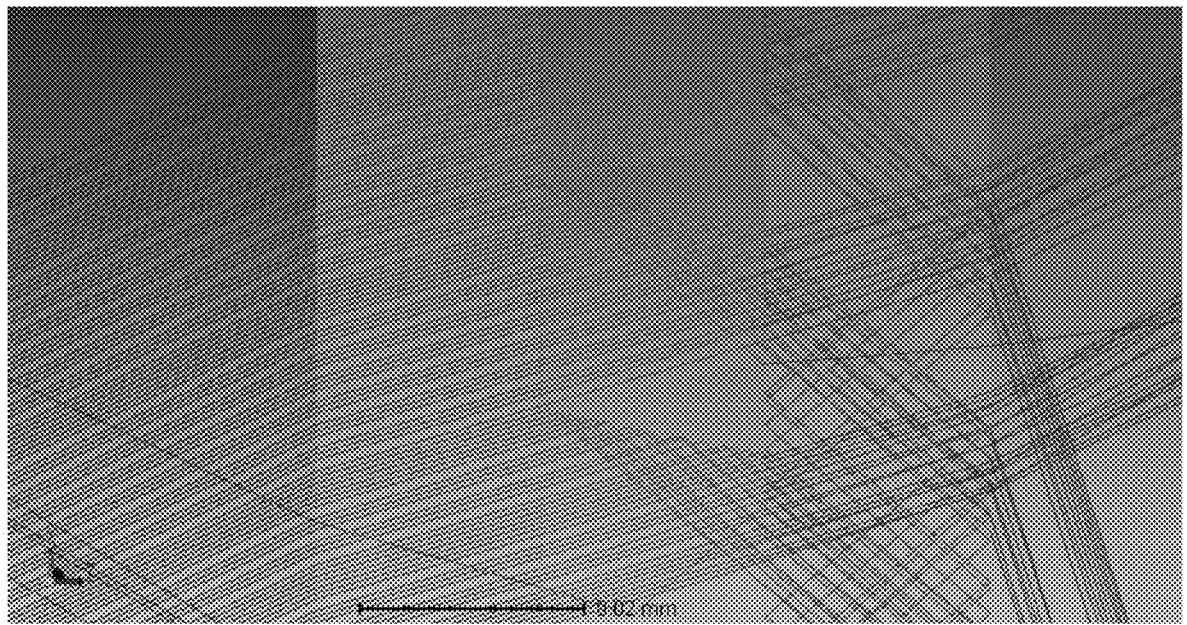
FIG. 28: ANGLE OF INCIDENCE 25 degrees.
Figure 29:
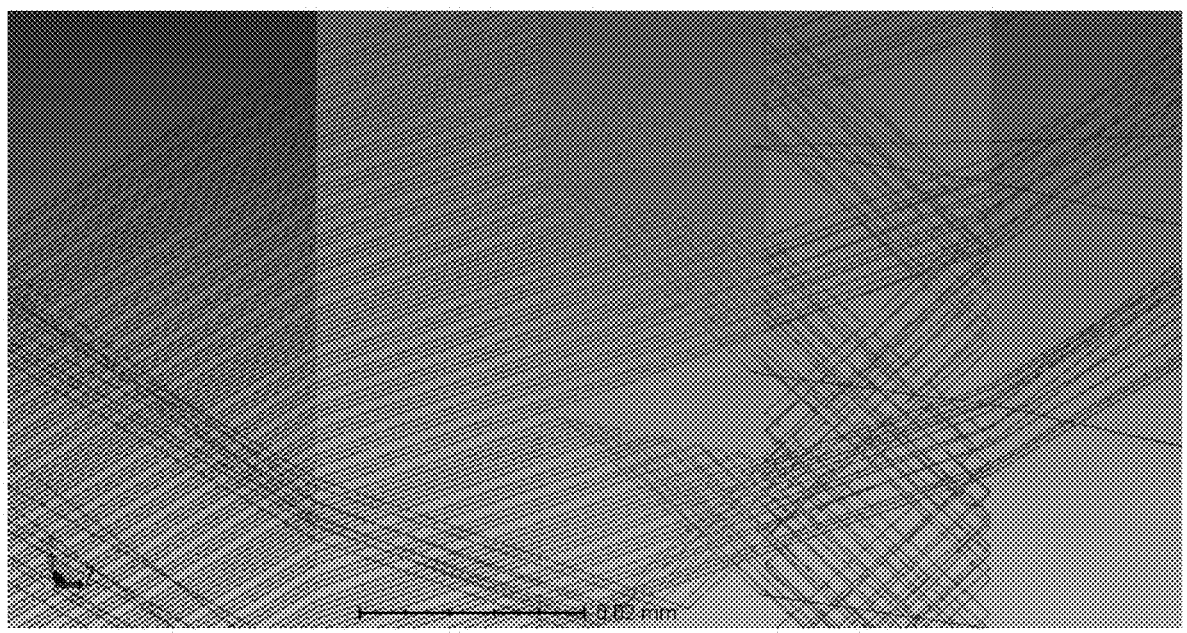
FIG. 29: ANGLE OF INCIDENCE 30 degrees.
Figure 30:
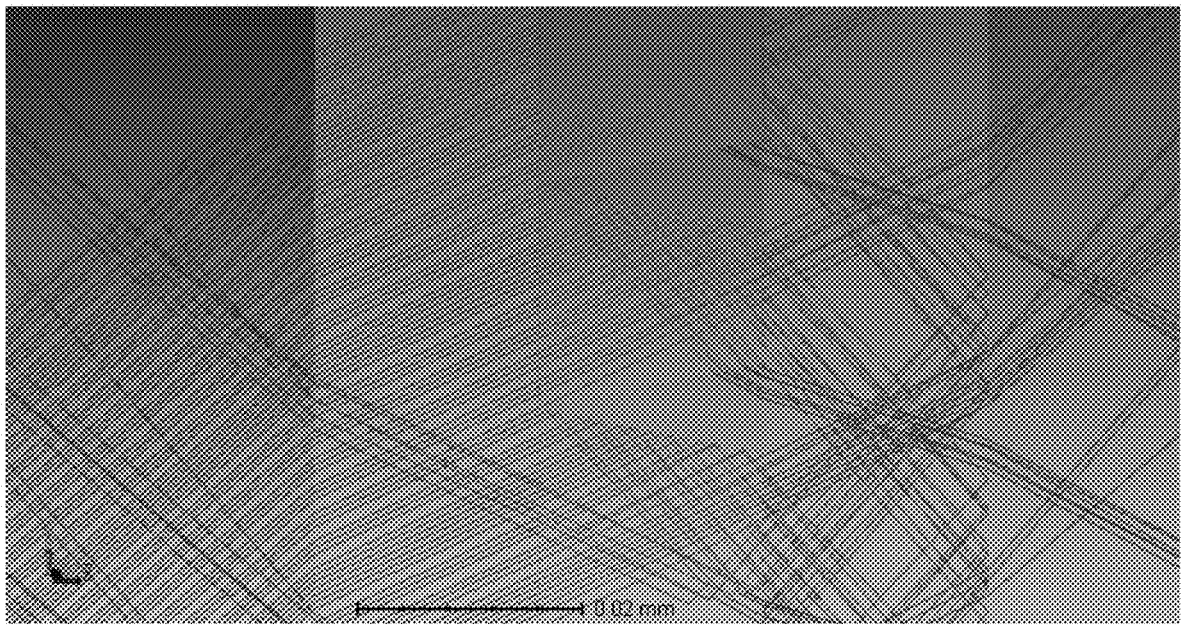
FIG. 30: ANGLE OF INCIDENCE 40 degrees.
Figure 31:
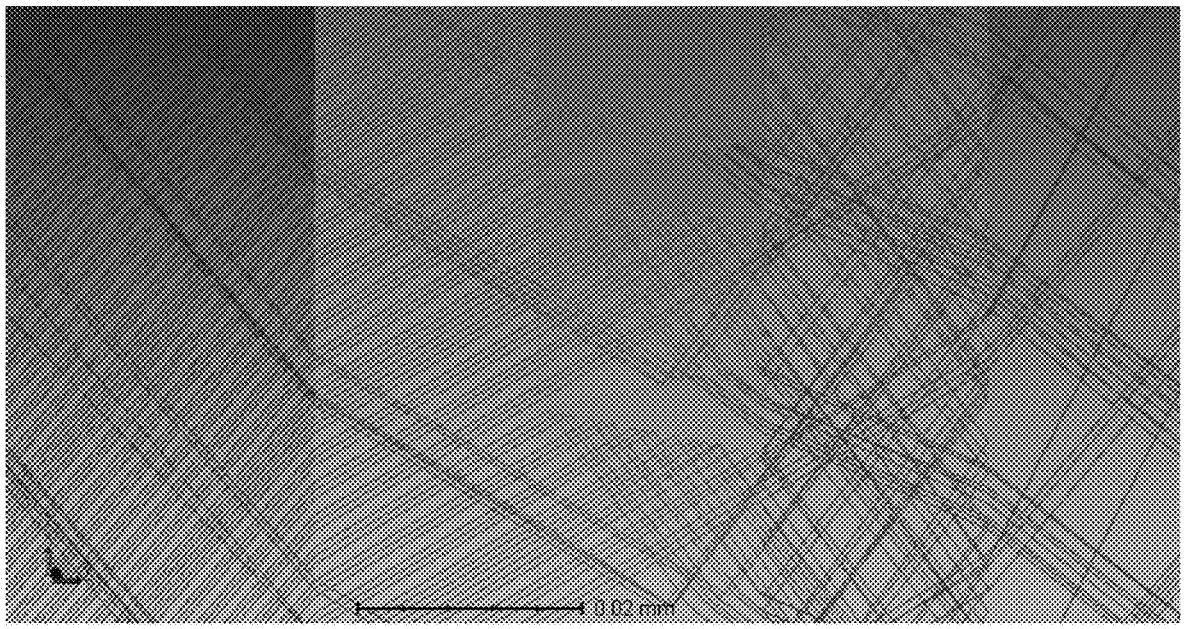
FIG. 31: ANGLE OF INCIDENCE 50 degrees.
Figure 32:
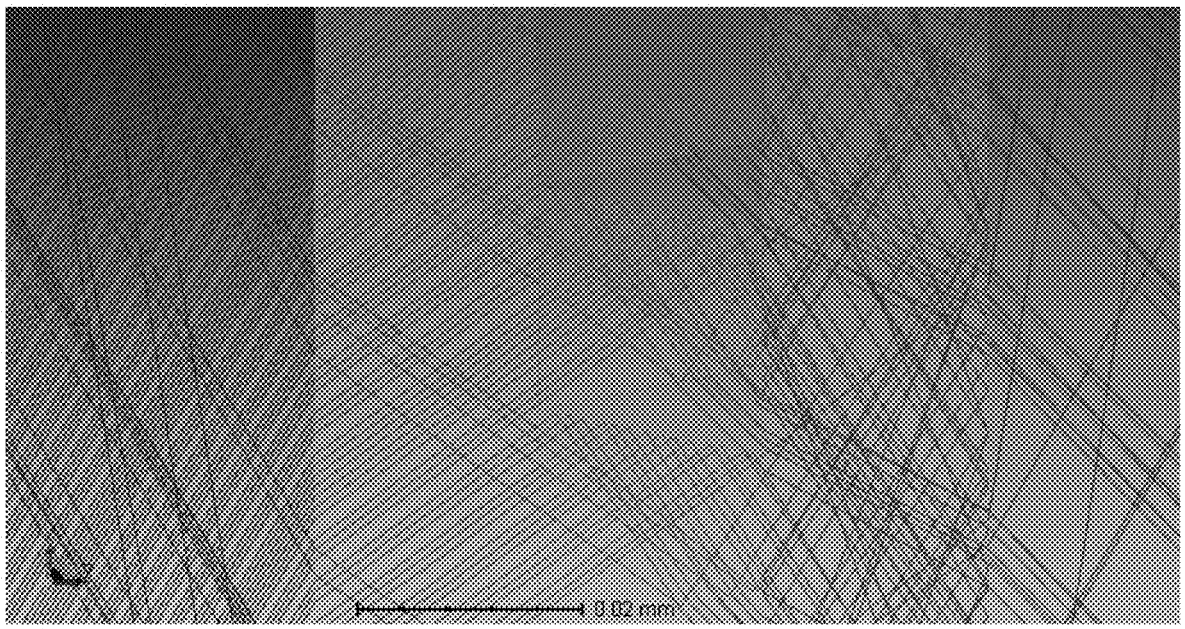
FIG. 32: ANGLE OF INCIDENCE 60 degrees.
Figure 33:
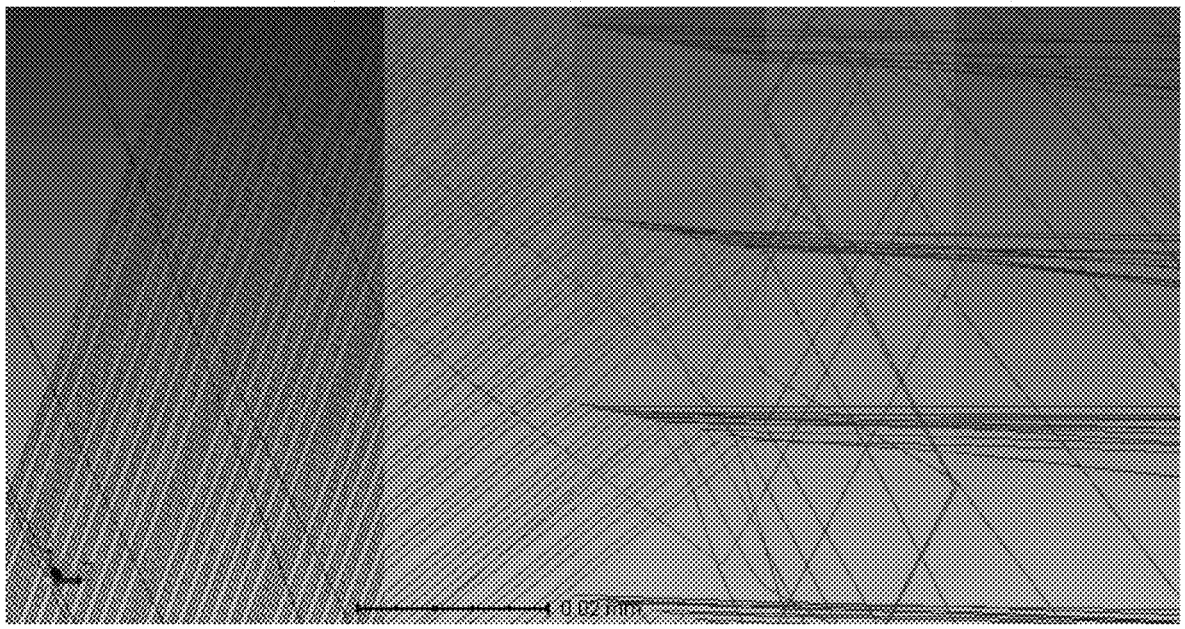
FIG. 33: ANGLE OF INCIDENCE 70 degrees.

FIGS. 23-33 show the side view of a film with an array of square frustums where the incident light that illuminates the front side of the substrate has a certain angle of incidence with respect to the normal surface of the substrate. The ray tracing shows the path of light in each situation. FIG. 23 shows the angle of incidence at zero degrees. FIG. 24 shows the angle of incidence at five degrees. FIG. 25 shows the angle of incidence at ten degrees. FIG. 26 shows the angle of incidence at fifteen degrees. FIG. 27 shows the angle of incidence at twenty degrees. FIG. 28 shows the angle of incidence at twenty-five degrees. FIG. 29 shows the angle of incidence at thirty degrees. FIG. 30 shows the angle of incidence at forty degrees. FIG. 31 shows the angle of incidence at fifty degrees. FIG. 32 shows the angle of incidence at sixty degrees. FIG. 33 shows the angle of incidence at seventy degrees.

To further elaborate, a frustum having a steep wall has an angle between the base of the frustum and the side wall, which is greater than a certain threshold angle. In another embodiment, the frustums with tops that are parallel to the surface of the substrate comprise steep side walls having a steepness of about 80 degrees from a plane of the surface of the substrate, wherein light illuminating the substrate does not produce reflective glare into a primary viewing angle range of about +/−30 degrees with respect to normal to the surface of the substrate, but does produce glare outside of the primary viewing angle. An internal angle of a side of the frustum to the base of the frustum is in the range of about 45 to 90 degrees. This structure results in a percentage of light that experiences total internal reflection on the side walls of the frustums and is transmitted fully through the film, and another percentage that experiences multiple total internal reflection events on surfaces of the frustums and/or a second substrate to which the tops of the frustums might be bonded wherein the light is ultimately reflected to the front surface of the first substrate. The reflected light is then transmitted through the first surface and at an angle with respect to normal to the film and is outside of the viewing angle of the primary viewer. The primary viewing angle is the angle from which the primary viewer observes the substrate. The substrate minimizes the glare for the primary viewer by minimizing the glare in an angular viewing range around the primary viewing angle. At the same time, glare is still present at angles outside of the angular viewing range of the primary viewing angle. The glare increases the difficulty of outside viewers to see the substrate and anything on the other side of the substrate, such as words and images.

Figure 34:
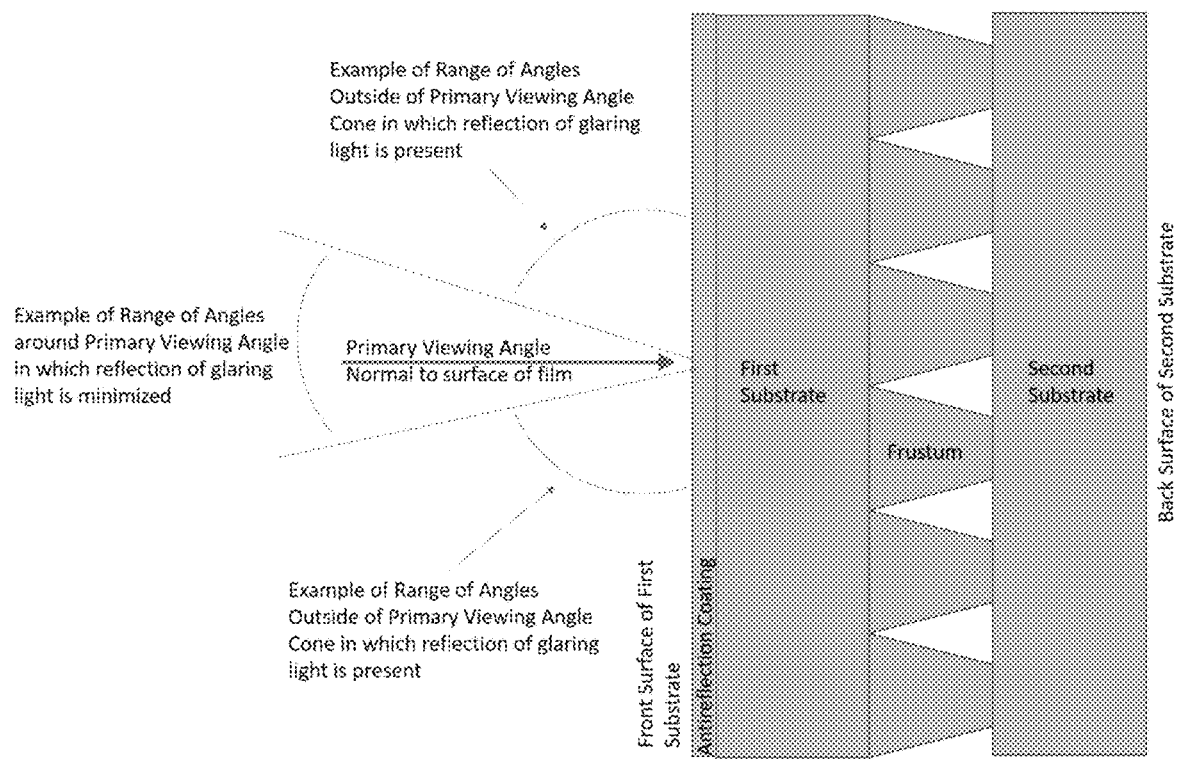
FIG. 34: Side View of Film with Array of Frustums showing a Primary Viewing Angle which is Normal to the First Surface of the Film (not drawn to scale).
Figure 35:
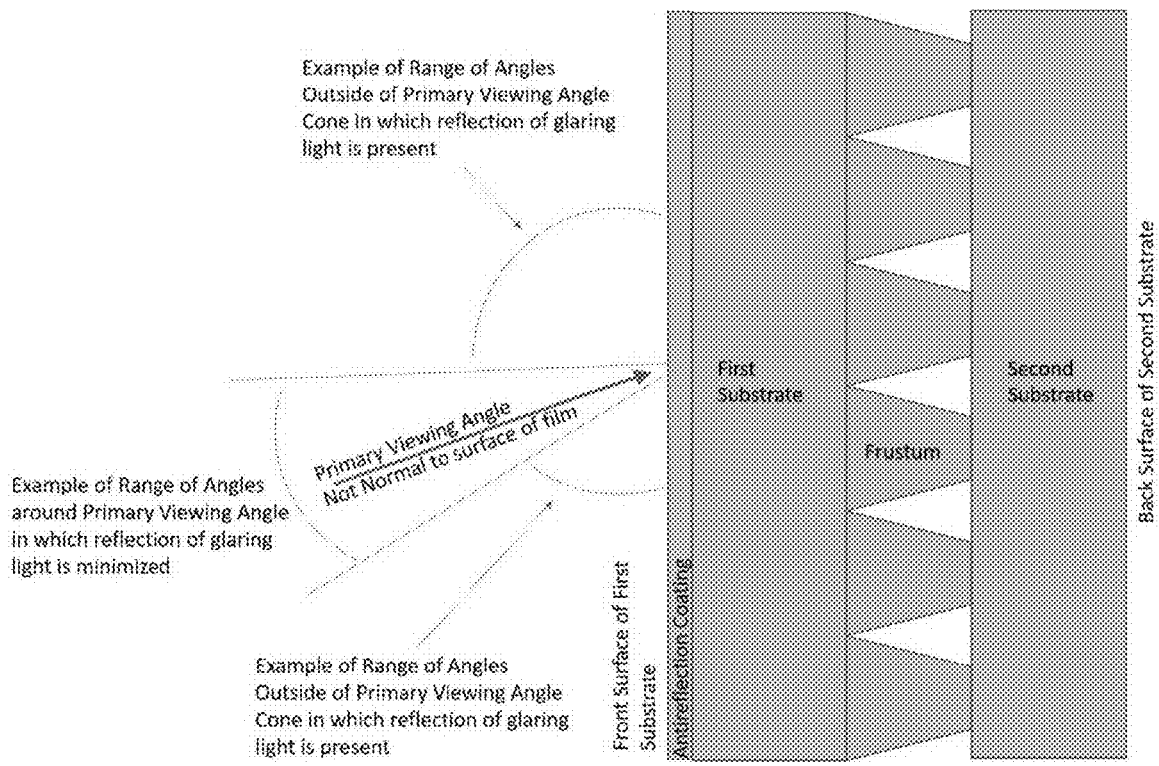
FIG. 35: Side View of Film with Array of Frustums showing a Primary Viewing Angle which is not Normal to the First Surface of the Film (not drawn to scale).

FIG. 34 shows a two-dimensional side view of a primary viewing angle of the substrate and the range of angles around the primary viewing angle in which the glare is minimized. The range of angles around the primary viewing angle in are within the plane of the figure. A three-dimensional frustum can have a three-dimensional range of angles around the primary viewing angle in which the glare is reduced. This is accomplished by having side walls of a frustum, which are perpendicular to multiple axes in a three-dimensional space. Examples include square frustum, hexagonal frustum, rectangular frustum and octagonal frustum. In this way, a privacy screen consisting of multiple frustums can create a three-dimensional cone of a range of angles around a primary viewing angle in which the glare is minimized. The shape of this cone can be adjusted by varying the number of side walls of the frustums and the three-dimensional positioning of the side walls of the frustums. The three-dimensional range of angles in which glare is reduced can be within an irregular cone. Two-dimensional figures, such as FIG. 34 can be used to represent how ranges of angles of minimized glare or maximized glare are created in a three-dimensional space. There is a range of angles that are outside the primary viewing angle range where reflection of glaring light is present. Because the reflection of glaring light is present in this range of angles outside the viewing angle range, it is difficult to see the privacy screen or to see anything on the other side of the privacy screen. Therefore, the reflected glaring light, which is present outside the primary viewing angle range, adds to the privacy for the primary viewer in viewing through the privacy screen. FIG. 35 shows a side view of a substrate with an array of frustums showing a primary viewing angle, which is not normal to the first surface of the substrate. Here for the primary viewing angle, which is a range of angles is like a cone shape, the reflection of glaring light is minimized. Glare is present in a range of angles that are outside the primary viewing angle. The range of angles is different on either side of the primary viewing angle.

Figure 36:
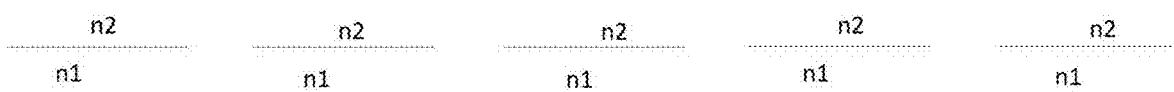
FIG. 36: Side View of Field of Interfaces between two Indexes of Refraction (n1 and n2).
Figure 37:
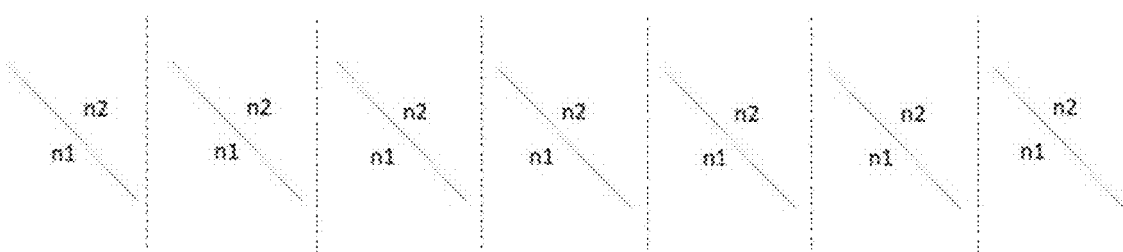
FIG. 37: Side View of Field of Interfaces between two Indexes of Refraction (n1 and n2).
Figure 38:
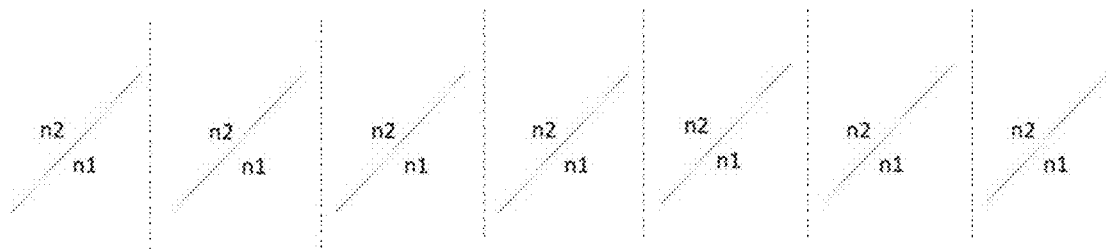
FIG. 38: Side View of Field of Interfaces between two Indexes of Refraction (n1 and n2).
Figure 39:
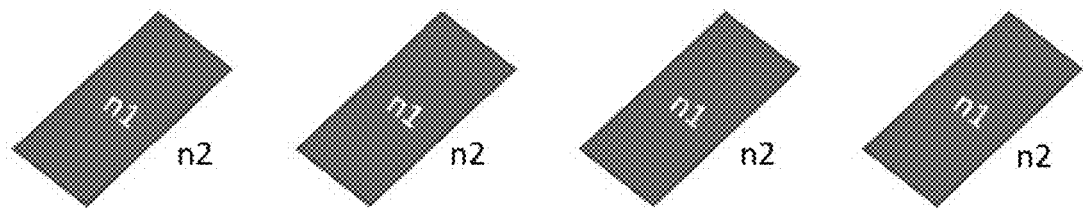
FIG. 39: Isometric View of Field of Flat Interfaces between two different Indexes of Refraction (n1 and n2) with n2 above each interface and n1 below each interface.
Figure 39:
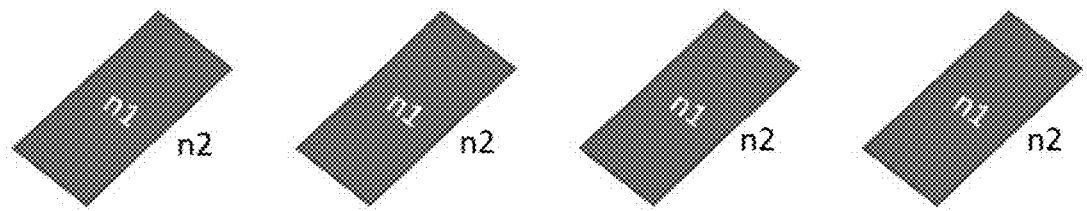
Figure 40:
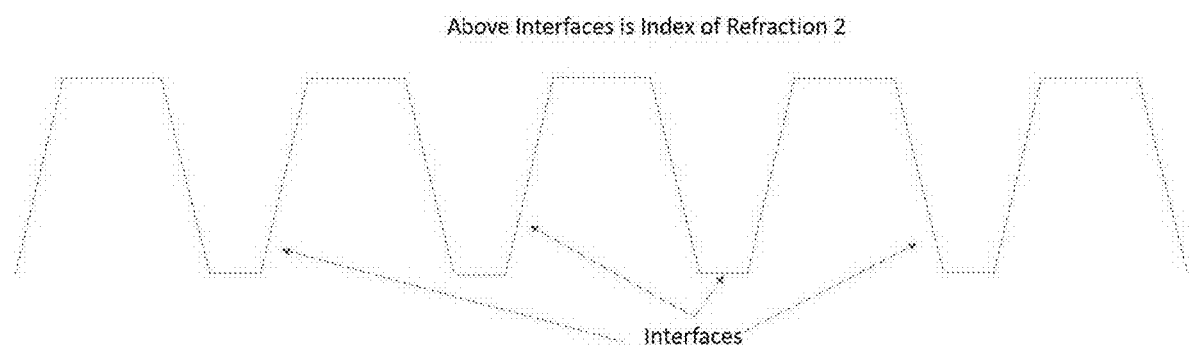
FIG. 40: Side View of Interfaces between two Indexes of Refraction (n1 and n2) arranged in a configuration.
Figure 41:
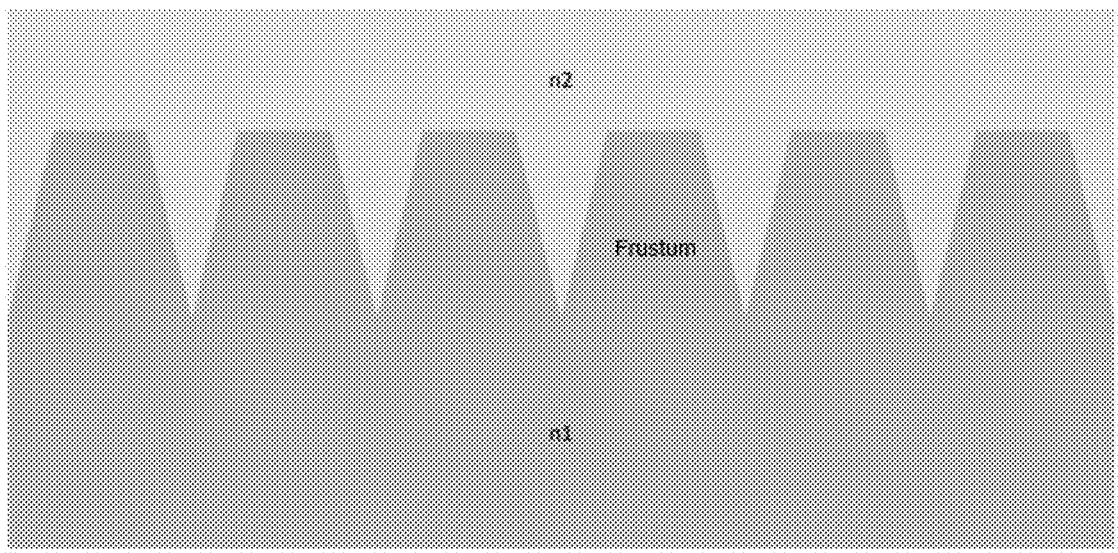
FIG. 41: Side View of array of Square Frustums on Substrate with Index of Refraction n1 in Frustums and base substrate and Index of Refraction n2 in space above Frustums.

FIGS. 36-40 illustrate the idea of interfaces of regions of two different indexes of refraction that can be arranged in various ways. FIG. 36 illustrates a side view of a field of interfaces between two indexes of refraction (n1 and n2). FIG. 37 illustrates a side view of a field of interfaces between two indexes of refraction (n1 and n2). FIG. 38 illustrates a side view of a field of interfaces between two indexes of refraction (n1 and n2). FIG. 39 illustrates an isometric view of a field of flat interfaces between two indexes of refraction (n1 and n2) with n2 above each interface and n1 below each interface. FIG. 40 is a side view of interfaces between two indexes of refraction (n1 and n2) arranged in a configuration. FIG. 40 shows how these interfaces between two different indexes of refraction can be designed to have the same pattern and effect as the square frustums arranged as an array on the back side of a substrate. FIG. 41 is a side view of an array of square frustums on a substrate with index of refraction n1 in frustums and substrate and index of refraction n2 in the space above the frustums.

Figure 42:
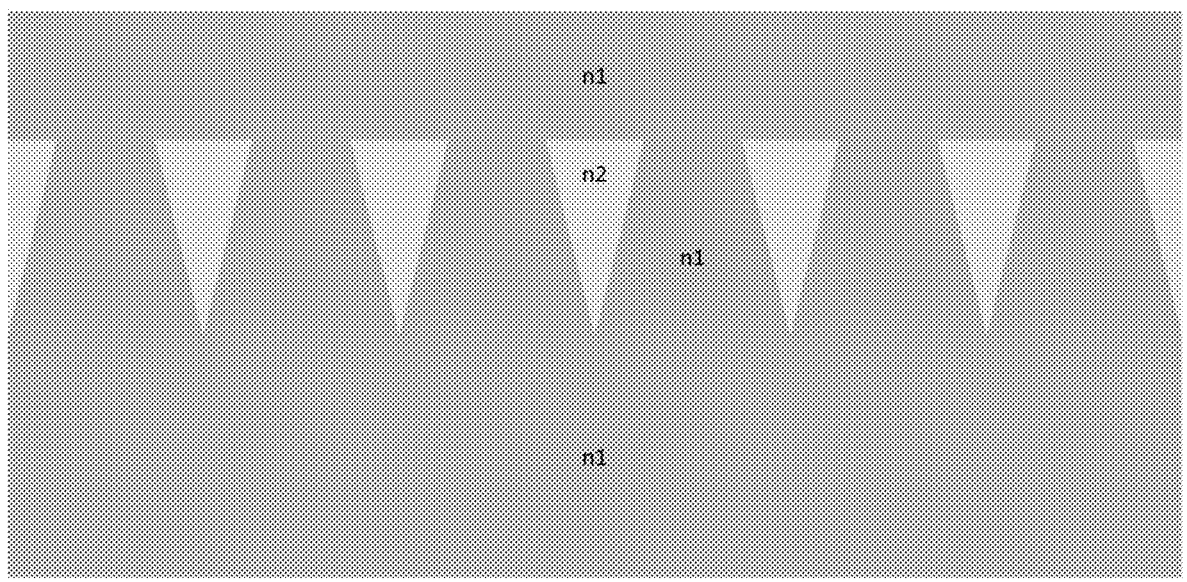
FIG. 42: Side View of Configuration of a Field of Interfaces between two Different Indexes of Refraction, n1 and n2.
Figure 43:
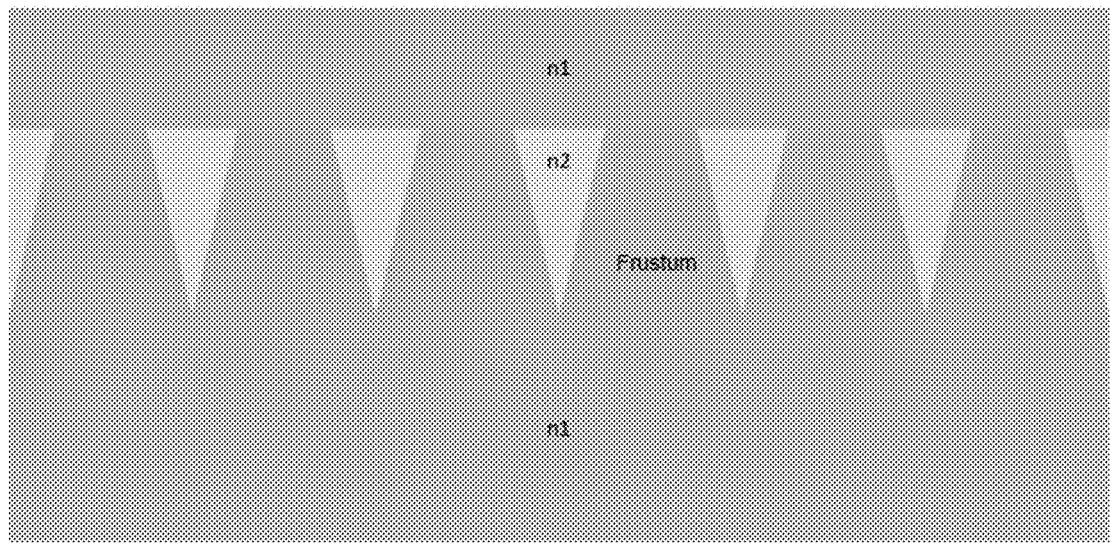
FIG. 43: Side View of array of Square Frustums on Substrate with Index of Refraction n1 in Frustums and Bottom Substrate and Index of Refraction n2 in space above Frustums and Below Second Substrate on top of Frustums.

In another embodiment, the total internal reflection on the back side of the first substrate is accomplished by embedding regions of lower index of refraction within the first substrate, shown in FIG. 42. FIG. 42 is a side view of a configuration of a field of interfaces between two different indexes of refraction, n1 and n2. FIG. 43 is a side view of an array of square frustums on a substrate with index of refraction n1 in frustums and substrate and index of refraction n2 in the space above the frustums and below the second substrate on top of the frustums. By comparing FIGS. 43 and 42, it is shown that the two different methods can be used to create a substrate with the same geometry and function. The regions of lower index of refraction can be created by embedding a solid, liquid, or gas with a lower index of refraction that the index of refraction of the substrate, or by creating regions of a vacuum. The regions of lower index of refraction have the opposite polarity of the shapes of the frustums.

Figure 44:
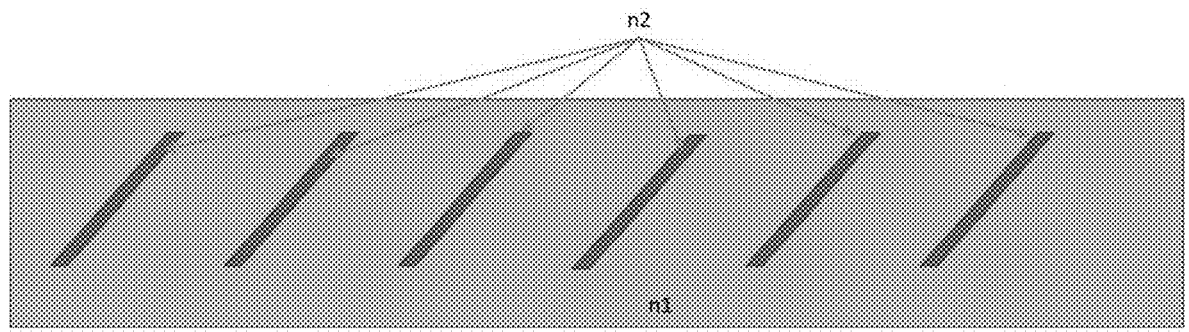
FIG. 44: Side View of Substrate with Embedded regions with a different index of refraction than the substrate.
Figure 45:
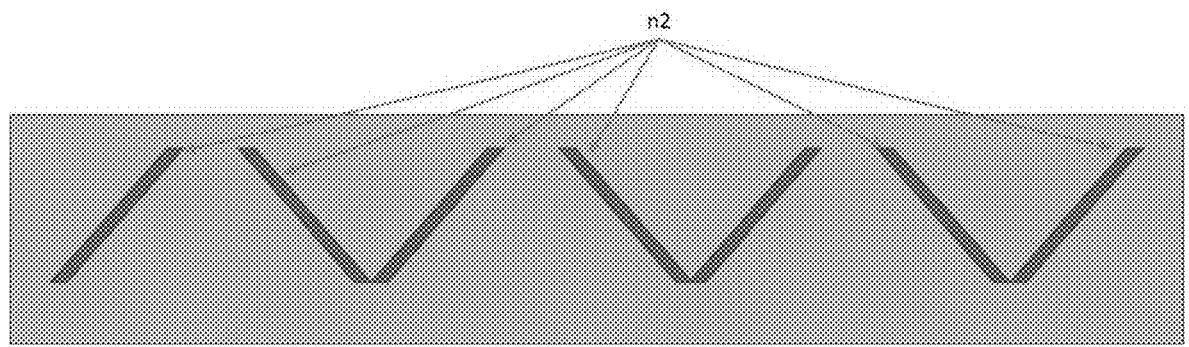
FIG. 45: Side View of Substrate with Embedded regions with a different index of refraction than the substrate.

In another embodiment, regions of various shape and arrangement consisting of vacuum or materials with an index of refraction lower than the surrounding substrate can be embedded in the substrate. Two examples of this are shown in FIGS. 44 and 45. FIG. 44 shows a side view of a substrate with index of refraction n1 with embedded regions with a different index of refraction n2 than the substrate. FIG. 45 shows a side view of a substrate with index of refraction n1 with embedded regions with a different index of refraction n2 than the substrate.

One or more of parameters of the frustums can be varied to optimize optical performance, wherein the parameters include height, size, spacing from a center of one frustum to a center of an adjacent frustum, arrangement, rotation of the frustum about an axis normal to a surface of the substrate, angles between a side of the frustum and the base of the frustum, centeredness of the top surface of the frustums with respect to the base of the frustums, index of refraction of the frustums, and combinations thereof. FIG. 60 shows side views of three different types of frustum in which the tops of the frustums are either all parallel to the surface of the substrate or the tops of the frustums are all parallel to each other but not parallel to the surface of the substrate, or the tilt of the top surfaces of modified frustums vary by a gradient with respect to the surface of the substrate.

Figure 61:
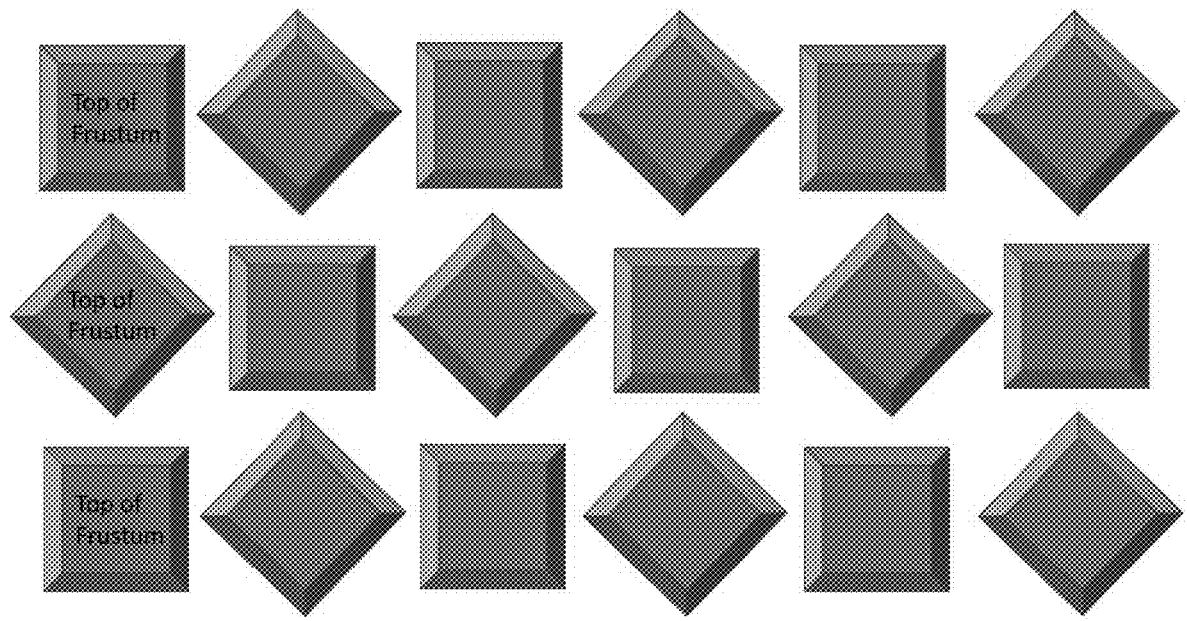
FIG. 61: Example of top view of square frustum in which alternating frustums are rotated 90 degrees.

In one embodiment, there is an array of square frustum in which alternating frustum are rotated 90 degrees with respect to each other, as seen in FIG. 61. In this embodiment, each row of alternating frustum is combined with other rows of alternating frustum such that the frustum in each column are also alternating in their rotation by 90 degrees. In alternative embodiments, the rotation of the alternating frustums can be any angle between 0 to 360 degrees and the frustums can be other shapes besides squares, such hexagons or triangles or octagons or other shapes. Additionally, there can be a series of frustums in which each frustum in the series is successively rotated a fixed amount, between 0 and 360 degrees, and then the series repeats as a pattern. For example, the first square frustum in a series could be rotated 0 degrees, the second rotated 15 degrees, the third rotated another 15 degrees to make a total rotation of 30 degrees, the fourth square frustum in the series rotated a total of 45 degrees, the fifth square frustum in the series rotated 60 degrees, the sixth frustum in the series rotated 75 degrees. Next, the series would repeat over and over across the entire film. Multiple rows of these repeating series would be combined in this embodiment. Arranging the slanted sides of the frustums to face multiple directions increases the directions along which glare is decreased for the primary viewer and increased for viewers outside the range of the primary viewing angle. The slanted sides of the frustum can be arranged to face multiple directions by rotating the frustum in a pattern, as described above, or randomly.

Figure 46:
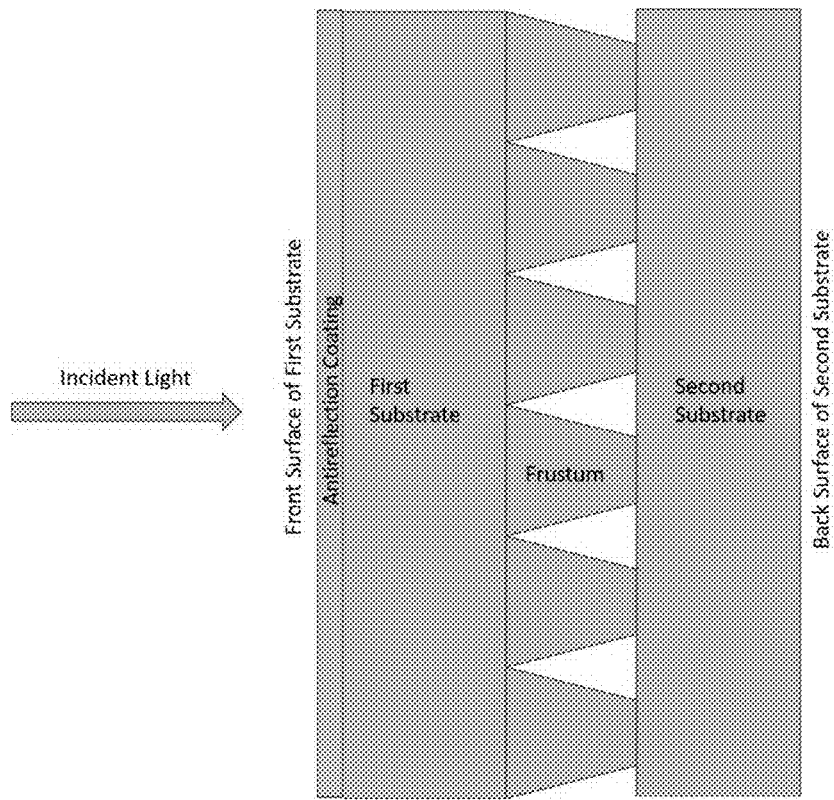
FIG. 46: Side View of Film consisting of an array of Square Frustum between Two Substrates.
Figure 47:
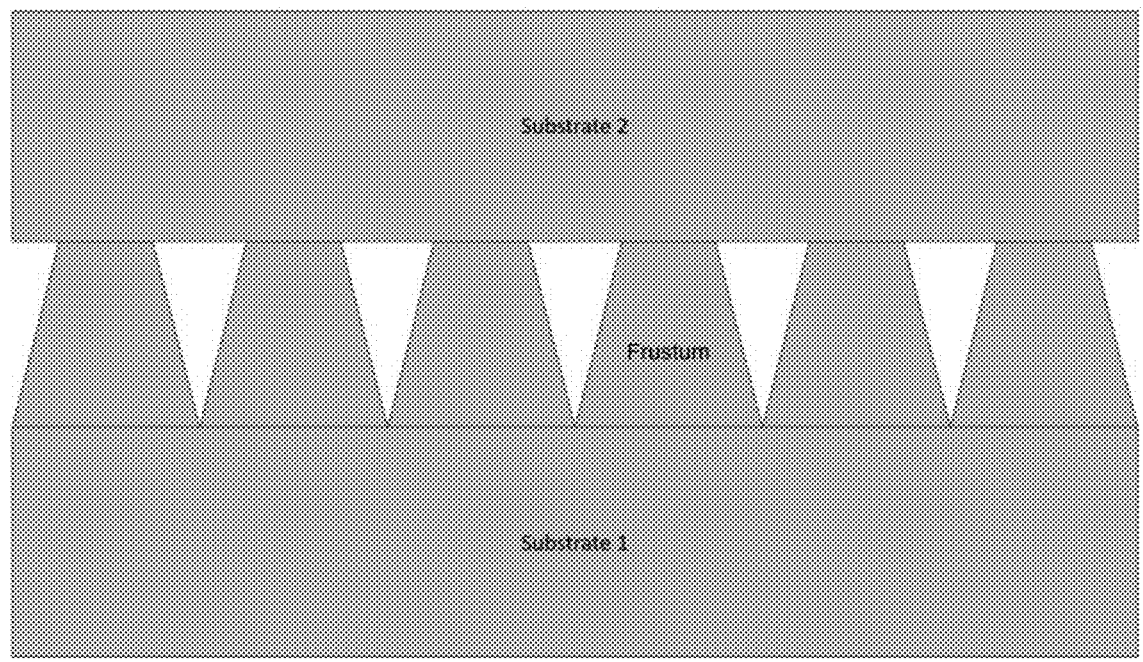
FIG. 47: Side View of Array of Square Frustums with Second Substrate bonded to the tops of the Frustums where all materials have the Substantially the Same Index of Refraction.

In another embodiment, the privacy screen has two substrates, with the frustums in between them, as shown in FIGS. 46 and 47. The index of refraction of the first substrate, frustums, and second substrate are all substantially the same, as seen in FIG. 41. As a result of the matching indexes of refraction, the light that is transmitted through the frustums is also transmitted through the second substrate. FIG. 46 shows a side view of a privacy screen or film with an array of square frustums in between two substrates with an antireflection coating on the front surface of the first substrate. FIG. 47 shows a side view of an array of square frustums with a second substrate bonded to the tops of the frustums. In this embodiment, the tops of the frustums are in full contact with the surface of the second substrate for all the area of the tops of the frustum.

In the embodiment of two substrates, the substrates can be the same or different composition. Also, the two substrates can have the same or different index of refraction. In one embodiment, a second substrate is bonded to the top surfaces of the frustums, wherein the top surfaces of the frustums is in contact with a surface of the second substrate, wherein the second substrate comprises a same index of refraction as the frustums and a first substrate, wherein there is no significant back-scattering of light passing through an interface between the top surfaces of the frustums and the surface of the second substrate, and wherein there is no significant degradation in transmission of light passing through the first substrate, the frustums, and second substrate due to the interfaces. The tops of the frustums that will be adjacent to or bonded to that second substrate do not have an anti-reflective coating.

In another embodiment, a small gap remains between most of the tops of the frustums and the second substrate. The gap can be formed by the tops of the frustums not being flat but rather having a portion of the top of the frustums which is raised up above the rest of the top surface. FIG. 8 shows the side view of a frustum with a lip on surface of the top of the frustum which extends around perimeter. The second substrate would be in full contact with the tops of the lips, which are the portions of the tops of the frustums, which are raised up above the rest of the tops of the frustums. However, there would be a gap between the tops of the frustums where there is no lip and the surface of the second substrate. This gap can be filled with air or a vacuum or other material, which has a lower index of refraction than the frustums and which is comparable in index of refraction to the index of refraction in the space in between the frustums. In general, the lip has a width and a height between 0.1 to 5 microns. Alternatively, in another embodiment, the top of each frustum would have the center of the top of the frustum raised up above the rest of the top of the frustum, rather than the perimeter of the top of the frustum being raised up above the rest of the top of the frustum. It would be the raised center of each frustum, which would contact the second substrate. When a second substrate is put in contact with the tops of the frustums from the first substrate, then a small air gap remains between most of the tops of the frustums and the second substrate, which can improve performance. Alternatively, another part of the top of each frustum could be raised up, rather than the center or the perimeter.

Figure 48:
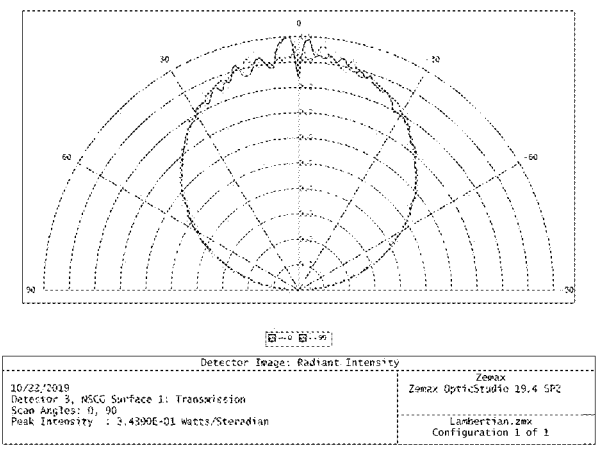
FIG. 48: Ambient Light Source on Film-Lambertian input light direction with no screen.
Figure 49:
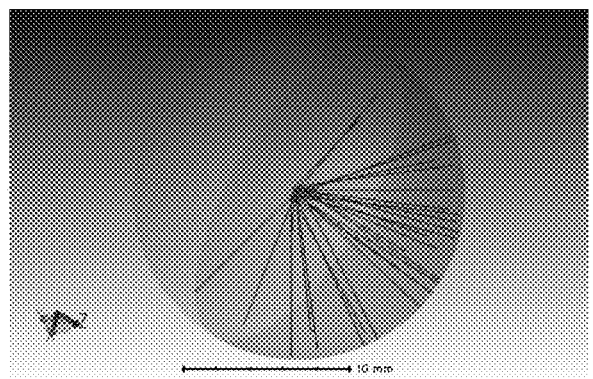
FIG. 49: A ray diagram of a radiant intensity distribution plot of Ambient Light Source on Film-Lambertian input light direction with no screen.
Figure 50:
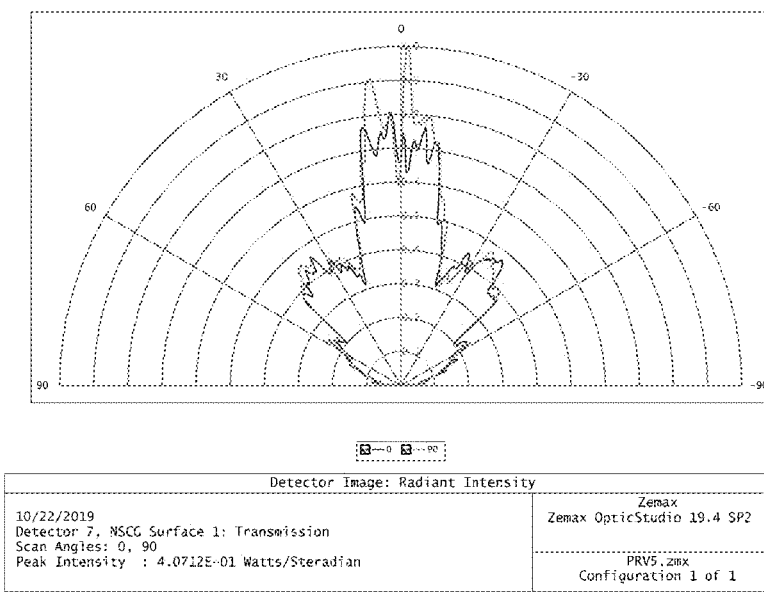
FIG. 50: Radiant intensity distribution plot through Film.
Figure 51:
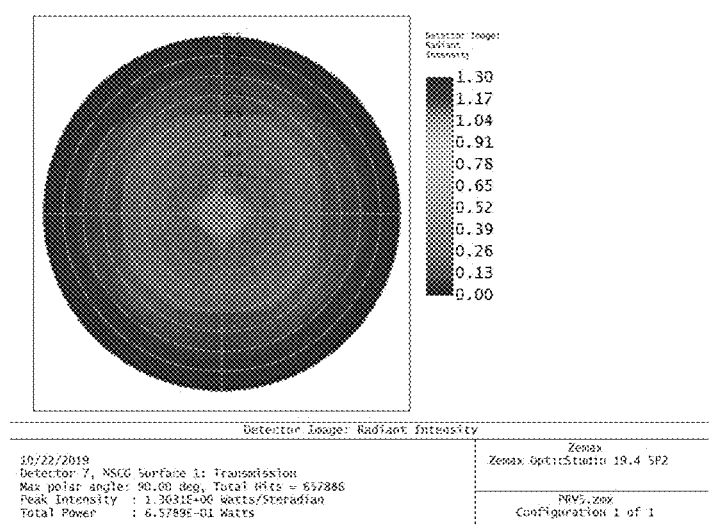
FIG. 51: Radiant intensity distribution of a single optical element.
Figure 52:
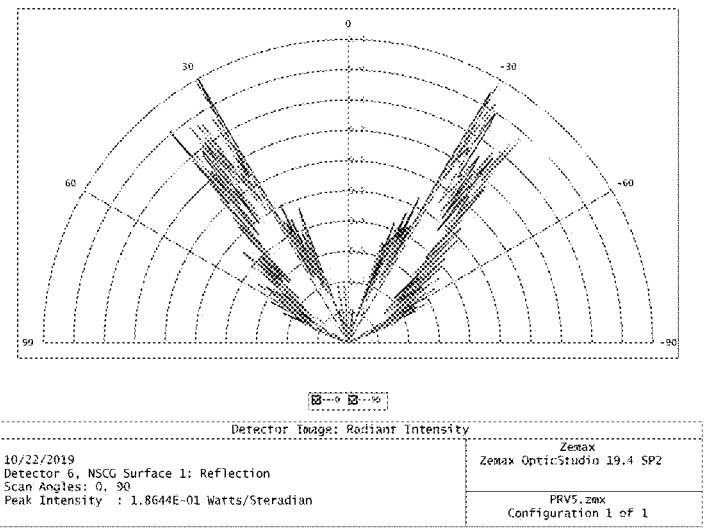
FIG. 52: Radiant intensity distribution plot of Light Reflected off Film.
Figure 53:
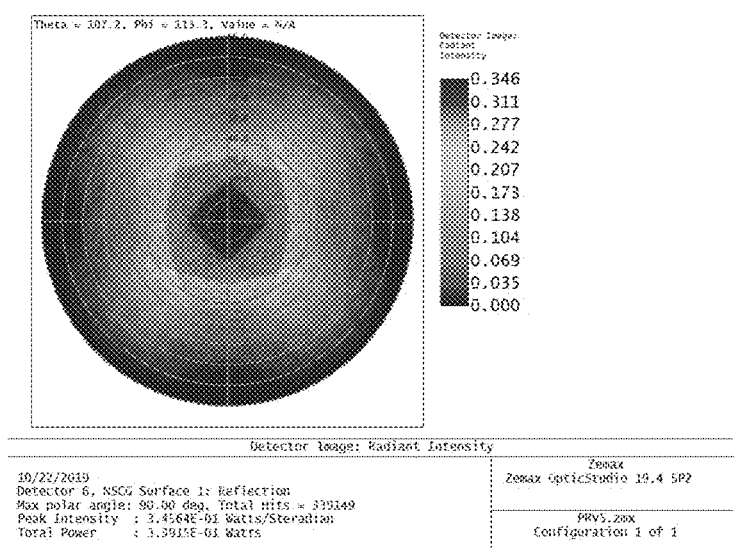
FIG. 53: Radiant intensity distribution plot of Light Reflected off Film for a single optical element.

FIGS. 48-53 show the light incident on the substrate, the light transmitted through the substrate, and the light reflected off the substrate. FIG. 48 shows a graph of an ambient light source on a film substrate with Lambertian input light direction with no screen. FIG. 49 is a ray diagram with a limited number of rays representing a radiant intensity distribution plot of an ambient light source on a film substrate with Lambertian input light direction with no screen. FIG. 50 shows a radiant intensity distribution plot of the result of a Lambertian input on the privacy screen and profile of the light that transmits through the film. FIG. 51 shows a radiant intensity distribution plot of a single optical element for a privacy screen that has a substrate, an array of square frustums, and a second substrate on top of the frustums. FIG. 52 shows a radiant intensity distribution plot of light reflected off a film substrate for a privacy screen that has a substrate, an array of square frustums, and a second substrate on top of the frustums. FIG. 53 shows a radiant intensity distribution plot of light reflected off a film substrate for a single optical element.

Figure 54:
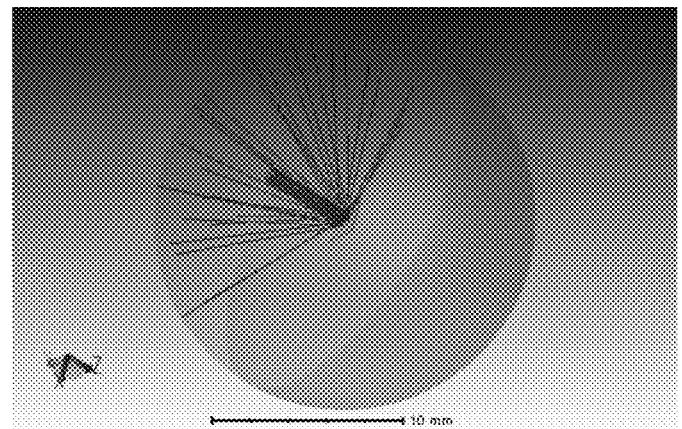
FIG. 54: Lambertian Reflector with Collimated Input.
Figure 55:
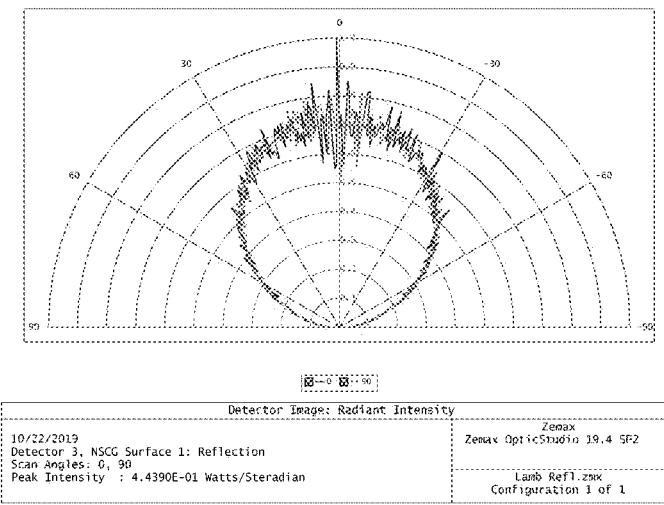
FIG. 55: Radiant intensity distribution plot of Lambertian Reflector with Collimated Input.
Figure 56:
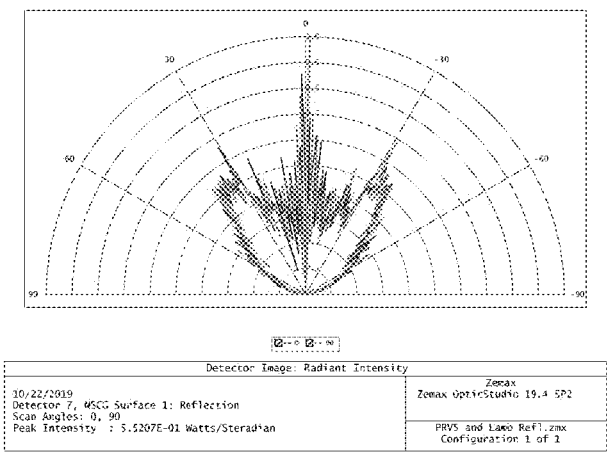
FIG. 56: Radiant intensity distribution plot of Light Reflected from Film and Lambertian Reflector Combined.
Figure 57:
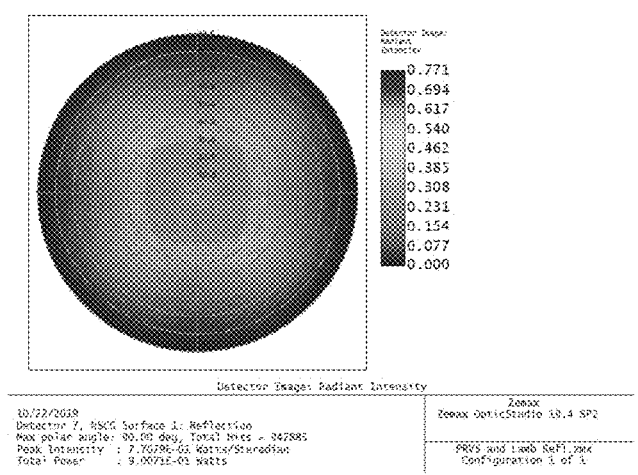
FIG. 57: Light Reflected from Film and Lambertian Reflector Combined.

In one embodiment, the substrate with frustums is applied to the display of an e-reader, and the transmitted light is used to view the e-reader. The light that transmits through the substrate with frustums illuminates the e-reader display, then reflects off the e-reader display and passes back through the substrate to the primary viewer. In this embodiment, the size of the frustums can be made to match the size of the pixels of the e-reader display and the array of frustums on the substrate can be aligned with the array of pixels in the e-reader so as to avoid adverse viewing effect, such as Moiré effects. This matching can include matching the spacing of the frustums to the spacing of the pixels of an electronic device display to which the frustums are applied. FIGS. 54-57 show the light incident on the substrate, which is on an e-reader surface, and the combination of light, which reflects off the substrate and transmits through the substrate from the e-reader, after reflecting off the e-reader. FIG. 54 is a Lambertian reflector with collimated input. FIG. 55 is a radiant intensity distribution plot of Lambertian reflector with collimated input. FIG. 56 is radiant intensity distribution plot of light reflected from film substrate and Lambertian reflector combined. FIG. 57 is light reflected from a film substrate and Lambertian reflector combined.

In another embodiment, the substrate with the frustums is applied to the screen of a display, such as an LED display, an LCD display, a computer display, a phone display, a tablet display, or any other type of electronic display. In this embodiment, the size of the frustums can be made to match the size of the pixels of the display, and the array of frustums in the substrate can be aligned with the array of pixels in the display, so as to avoid Moiré effects. In another embodiment, the frustums are nearly perfectly aligned with pixels of a display and there are an integer number of one or more frustums within each pixel pitch. In one embodiment, the frustums are rectangular frustum and there can be an integer number of frustums in one axis and an integer number of frustums in the other axis. The number of frustums in these two axes can be different but must be integers.

In another embodiment, the substrate with frustums is applied to an electronic display, a window, or other viewing surface, which serves as a privacy screen. The privacy screen for a display or a window includes an array of frustums positioned on a substrate wherein an index of refraction of the substrate is comparable to an index of refraction of the frustum, wherein an index of refraction of the spaces between the frustums is lower than the index of refraction of the frustums, and wherein incoming light is controlled in at least one direction.

A molding fabrication process allows for simple and large area fabrication making these arrays applicable to small and large display applications. In one embodiment of the fabrication process, the frustums are first patterned in photoresist using a Direct-Write-Laser (DWL) technique. The thickness of the photoresist is precisely and uniformly controlled to match the heights of the frustums that are patterned all the way down to the substrate. In one embodiment, the tops of the frustums are defined by the exposed substrate that the photopolymer is on. This provides a smooth and well-defined top for the frustums and all the frustums are then coplanar with each other. The DWL toolset uses a rastering laser beam to expose the entire depth of the resist in one or several passes. Other conventional photolithographic techniques, such as Photomask aligners and/or steppers and scanners can also be used to make these structures using contact or proximity lithography. The desired frustum angles can be achieved by imaging in grayscale or by tuning the lithographic process, such as the exposure conditions. A mold is then made using an electroforming process after depositing a seed layer on the frustums in resist. The frustums are then replicated into a transparent flexible or rigid plate using a mold transfer process.

In another embodiment, a method of fabricating a flexible or rigid substrate, which includes an array of microstructures or nanostructures on one side of the substrate comprises coating a substrate with a uniform thickness of photoresist polymer; which includes applying a rastering laser beam to develop and form a series of identical or non-identical microstructures or nanostructures wherein the microstructures or nanostructures comprise frustums or inverse frustums, and wherein the developed photoresist can be used to make molds, replicas, final parts, or mixtures thereof.

Figure 58:
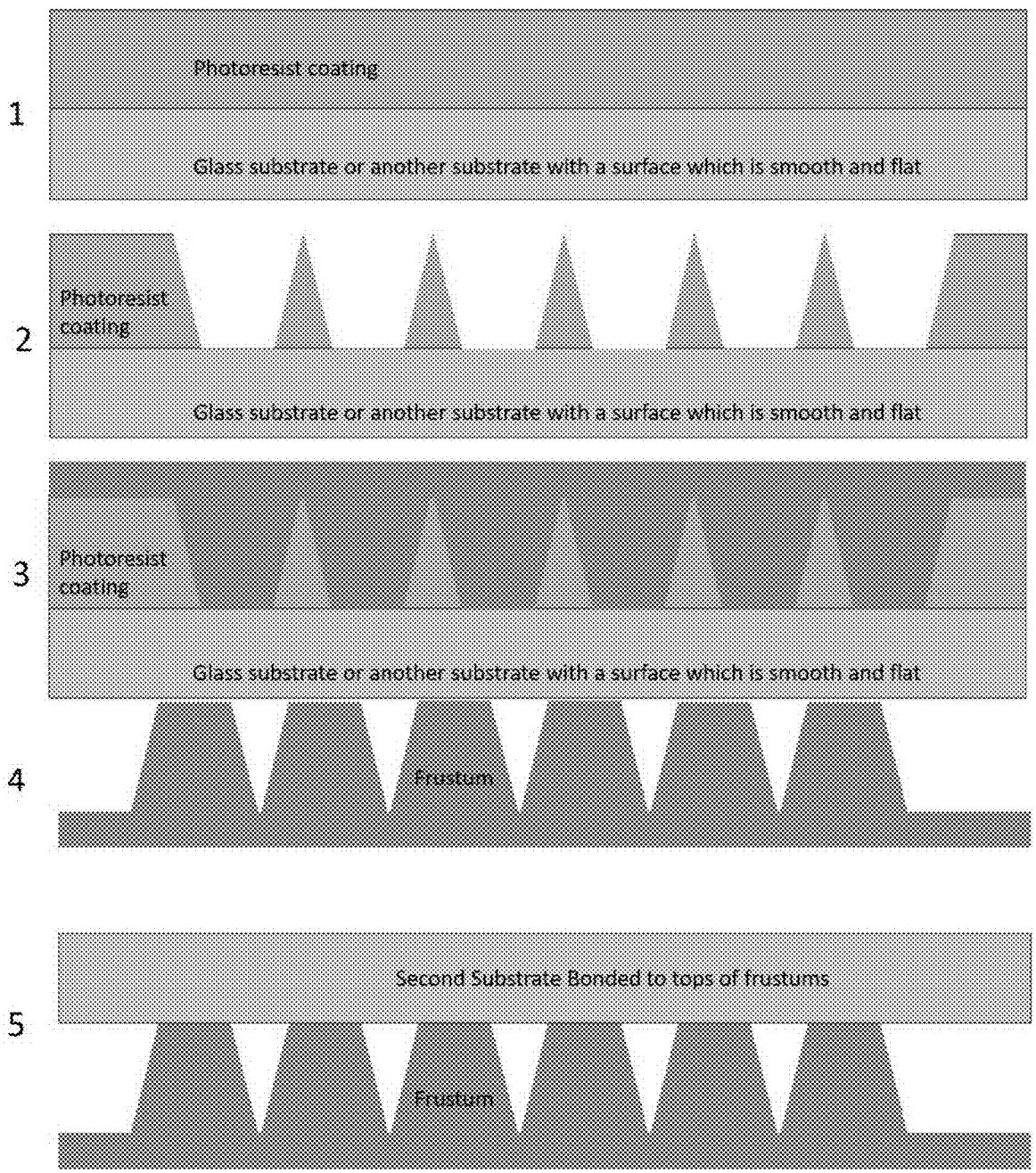
FIG. 58: Method of Making Privacy Screen with Frustums.
Figure 59:
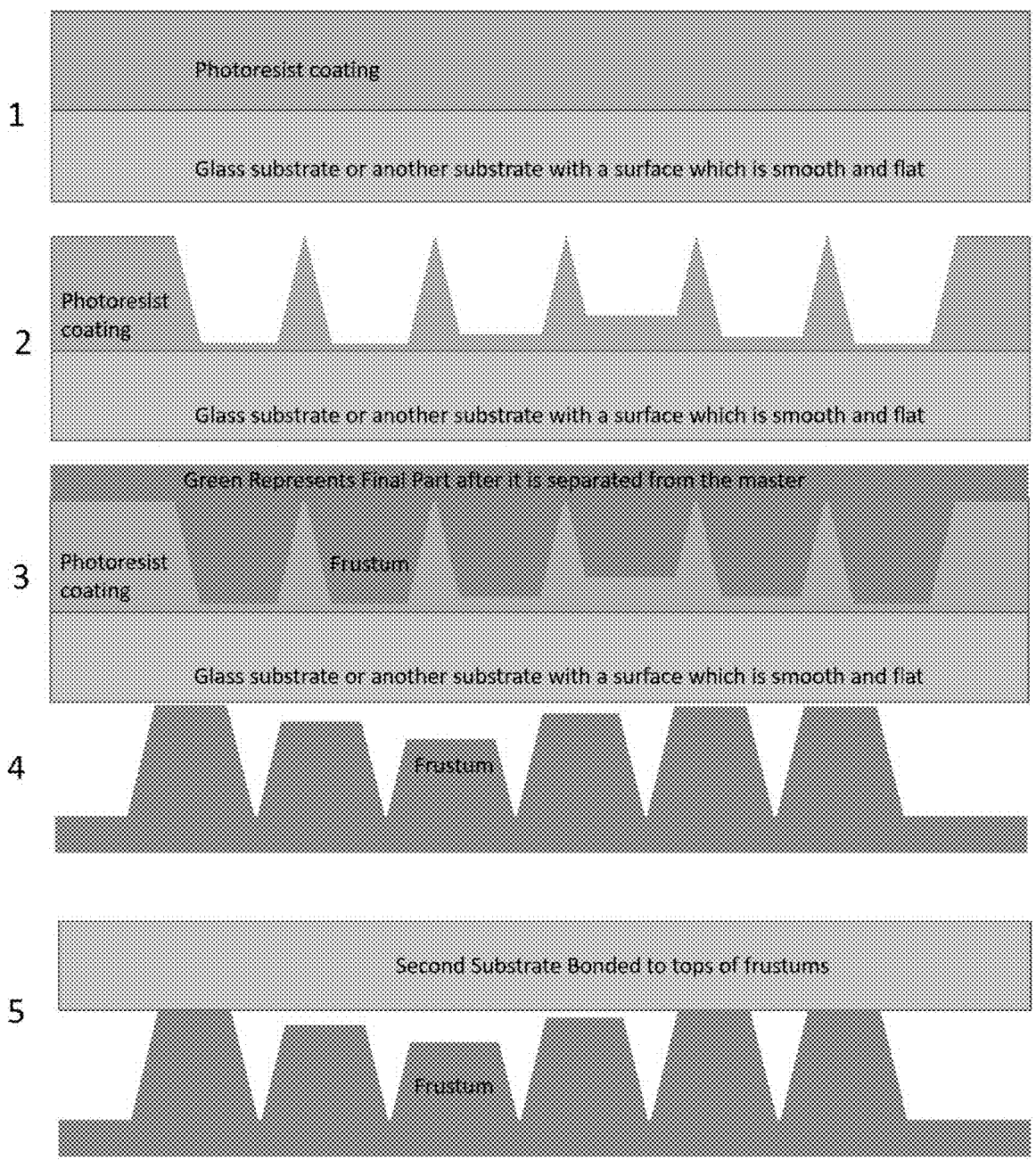
FIG. 59: Method of Making Privacy Screen with Uneven Frustums.'

In another embodiment, as shown in FIG. 58, a method of making a master includes obtaining a smooth, flat substrate, such as glass, placing a photoresist coating on one surface, exposing the photoresist coating to light in a frustum pattern and removing the exposed regions of the photoresist. This can be done by a photolithography process, a mechanical process, such as diamond turning, or a e-beam etching process. FIG. 58 shows 5 of the steps in this method from the top of the figure to the bottom of the figure. The patterned photoresist on the glass substrate is then used as a master to replicate the frustums. The glass substrate is exposed in the regions, which will become the tops of the frustums by completely removing the photoresist in these regions. The master is used to make copies of the inverse of the pattern of the photoresist. The tops of the frustums are all flat and co-planar because they were formed on the exposed surface of the smooth glass substrate. Therefore, the tops of the frustums of the new part can be bonded to a second substrate if desired. FIG. 59 shows the opposite of this situation. FIG. 59 shows 5 of the steps in this method from the top of the figure to the bottom of the figure in which the glass substrate is not completely exposed for the tops of all the frustums, and therefore, the tops of the frustums of the replicated part from the photoresist master are not co-planar. This is less desirable when a second substrate is to be bonded to the tops of all the frustums and the goal is for the tops of the frustums to have full contact with the second substrate. However, when it is desirable for a small gap to be present between most of the frustums and a second substrate, then having a small number of frustums be formed against the exposed glass substrate and the rest being less deep and not reaching the glass substrate can be desirable. In this embodiment, the frustums with tops which are formed against the glass substrate can be bonded to the second substrate. The rest of the frustums will have a gap between the top of the frustums and a second substrate. The frustums which contact the second substrate will provide a firm point of contact and create a fixed distance between the rest of the frustums and the second substrate.

In another embodiment, the privacy screen can be formed by the microstructures or nanostructures on a substrate wherein the microstructures or nanostructures are an inverse surface relief of frustums. In this embodiment, the inverse surface relief structures are formed on the substrate and then another material with a higher index of refraction fills in the surface relief structure. The inverse surface relief structure has a lower index of refraction than the material which fills it in. Both materials are transparent to the wavelengths of light in which the privacy screen operates. The top surface of the second material which fills in the inverse surface relief structures is smooth. One advantage of this embodiment is that air is not needed within the privacy screen. FIG. 41 shows the sideview of such an embodiment. The green region is a substrate with a surface relief of inverse frustums. The index of refraction of the green region is n2 and the index of refraction of the blue region is n1. The blue region is the second material that is filled into the inverse frustum surface relief structures. In this embodiment, n2 is lower than n1.

Alternative embodiments of the subject matter of this application will become apparent to one of ordinary skill in the art to which the present invention pertains without departing from its spirit and scope. It is to be understood that no limitation with respect to specific embodiments shown here is intended or inferred.

What is claimed is:

1. A solid substrate comprising optical elements comprising surface microstructures or nanostructures that (a) allow incident light to pass through when the light is within selected angles from normal to a plane of a display screen or window, and (b) block other incident light to pass through when the other incident light is outside the selected angles wherein the other incident light outside the selected angles undergoes total internal reflections within the surface microstructures before being reflected to a viewer, wherein the surface microstructures or nanostructures comprise multiple frustums of different shapes and/or different sizes.

2. The solid substrate of claim 1, wherein the optical elements comprise frustums comprising any part or whole of a geometric shape existing between two parallel planes.

3. The solid substrate of claim 1, wherein the optical elements cover the entire width and/or length of the display screen.

4. The solid substrate of claim 1, wherein the optical elements are arranged in an array.

5. The solid substrate of claim 1, wherein a base of the frustum comprises about 1-500 microns in width and wherein a top surface of the frustum comprises 0.5 to 499 microns in width.

6. The solid substrate of claim 1, wherein a base of the frustum is wider than a top surface of the frustum.

7. The solid substrate of claim 1, wherein the frustums have a height to base aspect ratio of about 1:1.

8. The solid substrate of claim 1, wherein the frustum comprises a shape comprising conical, square, pentagonal, hexagonal, octagonal, n-gon, rectangular, diamond, rhombus, quadrilateral, star, donut, irregular polygon, a shape comprising a hollow central region or combinations thereof.

9. The solids substrate of claim 1, wherein the solid substrate and the optical elements comprises identical materials.

10. The solid substrate of claim 1, wherein the indices of refraction of the solid substrate and the optical elements comprises identical indices of refraction.

11. The solid substrate of claim 1, wherein an internal angle of a side of a frustum to a base of the frustum is greater than or equal to 45 degrees.

12. The solid substrate of claim 1, wherein gaps exist between the bases of adjacent frustums in the array.

13. The solid substrate of claim 1, wherein the optical elements comprise inverse surface relief of frustums.

14. The solid substrate of claim 1, comprising an array of frustums with lengths significantly longer than widths.

15. The solid substrate of claim 1, wherein the frustums are arranged on the substrate in a pattern.

16. The solid substrate of claim 1, wherein the height of the frustum ranges from about 1 to 500 microns.

17. The solid substrate of claim 1, wherein a top surface of the frustums are parallel to other frustums, optionally wherein the top surfaces are tilted by a constant amount, a varying amount, a gradient, or a combination thereof.

18. The solid substrate of claim 1 wherein a spacing of the frustums match a spacing of pixels of a display of an electronic device to which the frustums are applied.

19. The solid substrate of claim 1 wherein the frustums comprise an array that is aligned with an array of pixels of a display of an electronic device to which the array of frustums is applied.

20. The solid substrate of claim 19 wherein there is an integer number of one or more frustums within each pixel pitch.

21. The solid substrate of claim 19 wherein the frustums comprise rectangular frustums wherein there is an integer number of frustums per pixel in one axis and an integer number of frustums per pixel in the other axis and wherein the number of frustums in the axes are the same number or a different number.

22. The solids substrate of claim 1, wherein the solid substrate and the optical elements comprises different materials.

23. The solid substrate of claim 1, wherein the indices of refraction of the solid substrate and the optical elements comprises different indices of refraction.

24. The solid substrate of claim 1, wherein or no gaps-exist between the bases of adjacent frustums in the array.

25. The solid substrate of claim 1, wherein a top surface of the frustums are not parallel to other frustums, optionally wherein the top surfaces are tilted by a constant amount, a varying amount, a gradient, or a combination thereof.

26. A solid substrate comprising optical elements comprising surface microstructures or nanostructures that (a) allow incident light to pass through when the light is within selected angles from normal to a plane of a display screen or window, and (b) block other incident light to pass through when the other incident light is outside the selected angles wherein the other incident light outside the selected angles undergoes total internal reflections within the surface microstructures before being reflected to a viewer
   wherein the optical elements comprise frustums comprising any part or whole of a geometric shape existing between two parallel planes; and
   wherein one or more characteristics of the frustums has been varied to optimize optical performance wherein the characteristics of the frustums comprises height, size, spacing from a center of one frustum to center of an adjacent frustum, arrangement, rotation of a frustum about an axis normal to a surface of the solid substrate, angles between a side of the frustum and the base of the frustum, centeredness of the top surface of the frustums with respect to the base of the frustums, index of refraction of the frustum, and combinations thereof.

27. A solid substrate comprising surface microstructures or nanostructures comprising frustums comprising individual structures having shapes having walls and surfaces, wherein the frustums control incident light striking the solid substrate, which control results in a percentage of light that experiences total internal reflection on the walls of the frustums wherein the percentage of light is transmitted fully through the solid substrate, and another percentage of light that experiences multiple total internal reflection events on the surfaces of the frustums wherein the another percentage of light is ultimately reflected to a front surface of the solid substrate to a viewer
   wherein the surface microstructures or nanostructures comprise multiple frustums of different shapes and/or different sizes.

* * * * *